US012586591B2

(12) United States Patent
Moriya et al.

(10) Patent No.: US 12,586,591 B2
(45) Date of Patent: Mar. 24, 2026

(54) SOUND SIGNAL DECODING METHOD, SOUND SIGNAL DECODER, PROGRAM, AND RECORDING MEDIUM

(71) Applicant: NTT, Inc., Tokyo (JP)

(72) Inventors: Takehiro Moriya, Tokyo (JP); Ryosuke Sugiura, Tokyo (JP); Yutaka Kamamoto, Tokyo (JP)

(73) Assignee: NTT, Inc., Tokyo (JP)

( * ) Notice: Subject to any disclaimer, the term of this patent is extended or adjusted under 35 U.S.C. 154(b) by 327 days.

(21) Appl. No.: 18/011,128

(22) PCT Filed: Jun. 24, 2020

(86) PCT No.: PCT/JP2020/024775
§ 371 (c)(1),
(2) Date: Dec. 16, 2022

(87) PCT Pub. No.: WO2021/260826
PCT Pub. Date: Dec. 30, 2021

(65) Prior Publication Data
US 2023/0298598 A1 Sep. 21, 2023

(51) Int. Cl.
*G10L 19/008* (2013.01)

(52) U.S. Cl.
CPC .................................. *G10L 19/008* (2013.01)

(58) Field of Classification Search
CPC ..................................................... G10L 19/008
(Continued)

(56) References Cited

U.S. PATENT DOCUMENTS 8,332,229 B2 * 12/2012 Samsudin ............. G10L 19/008 381/307
11,657,826 B2 * 5/2023 Dick ..................... G10L 21/038 704/500

(Continued)

FOREIGN PATENT DOCUMENTS

CN 108140393 B * 10/2023 ........... G10L 19/008

OTHER PUBLICATIONS

S. Miyabe, T. Mihashi, T. Takatani, H. Saruwatari, K. Shikano and T. Nomura, "Compressive Coding of Stereo Audio Signals Extracting Sparseness among Sound Sources with Independent Component Analysis," 2007 IEEE Workshop on Applications of Signal Processing to Audio and Acoustics, New Paltz, NY, USA, ( (Year: 2007).*

(Continued)

*Primary Examiner* — Bharatkumar S Shah

(57) ABSTRACT

The stereo decoding unit 220 performs steps S222-1 and S222-2 below (step S222). The stereo decoding unit 220 obtains a signal concatenating a sum signal (a signal configured by addition of sample values of corresponding samples) of the monaural decoded sound signal for the section Y and the additional decoded signal for the section Y and the additional decoded signal for the section X, as a decoded downmix signal for the section Y+X (step S222-1) instead of step S221-1 performed by the stereo decoding unit 220 of the first embodiment and obtains and outputs the decoded sound signals of the two channels from the decoded downmix signal obtained at step S222-1 by the upmix processing using the characteristic parameter obtained from the stereo code CS, using the decoded downmix signal obtained at step S222-1 instead of the decoded downmix signal obtained at step S221-1 (step S222-2).

9 Claims, 12 Drawing Sheets

(58) Field of Classification Search
USPC .......................................................... 704/500
See application file for complete search history.

(56) References Cited

U.S. PATENT DOCUMENTS

| | | | | |
|---|---|---|---|---|
| 11,832,078 | B2 * | 11/2023 | Laitinen .................... | H04S 3/02 |
| 11,962,990 | B2 * | 4/2024 | Sen ....................... | G10L 19/002 |
| 2010/0169102 | A1 * | 7/2010 | Samsudin ........... | G10L 19/0208<br>381/17 |
| 2015/0380001 | A1 | 12/2015 | Purnhagen et al. | |

OTHER PUBLICATIONS

Breebaart et al., "Parametric Coding of Stereo Audio", EURASIP Journal on Applied Signal Processing, pp. 1305-1322, 2005:9.
3GPP, "Codec for Enhanced Voice Services (EVS); Detailed algorithmic description", TS 26.445. pp. 1-22, 270-282, 570-579.
International Standard, ISO/IEC 14496-3 (2009) "Information technology—Coding of audio-visual objects" [on-line] website: https://csclub.uwaterloo.ca/~ehashman/ISO14496-3.2009.pdf.
Helmrich et al. (2015) "Low-complexity semi-parametric joint-stereo audio transform coding" 23rd European Signal Processing Conference, DOI: 10.1109/EUSIPCO.2015.7362492, pp. 799-803.

* cited by examiner

SOUND SIGNAL DECODING METHOD, SOUND SIGNAL DECODER, PROGRAM, AND RECORDING MEDIUM

CROSS-REFERENCE TO RELATED APPLICATIONS

This application is a U.S. National Stage Application filed under 35 U.S.C. § 371 claiming priority to International Patent Application No. PCT/JP2020/024775, filed on 24 Jun. 2020, the disclosure of which is hereby incorporated herein by reference in its entirety.

TECHNICAL FIELD

The present invention relates to a technology of embedded encoding/decoding of a sound signal having a plurality of channels and a sound signal having one channel.

BACKGROUND ART

As a technology of embedded encoding/decoding of a sound signal having a plurality of channels and a monaural sound signal, there is a technology of Non-Patent Literature 1. The summary of the technology of Non-Patent Literature 1 will be described with an encoding device 500 illustrated in FIG. 5 and a decoding device 600 illustrated in FIG. 6. For each frame which is a predetermined time section, a stereo encoding unit 510 of the encoding device 500 obtains, from a stereo input sound signal which is an inputted sound signal having a plurality of channels, a stereo code CS representing a characteristic parameter which is a parameter representing a characteristic of difference between the channels of the stereo input sound signal, and a downmix signal which is a signal obtained by mixing the stereo input sound signal. A monaural encoding unit 520 of the encoding device 500 encodes the downmix signal for each frame to obtain a monaural code CM. A monaural decoding unit 610 of the decoding device 600 decodes the monaural code CM for each frame to obtain a monaural decoded sound signal which is a decoded signal of the downmix signal. A stereo decoding unit 620 of the decoding device 600 performs, for each frame, process of obtaining the characteristic parameter which is the parameter representing the characteristic of the difference between the channels by decoding the stereo code CS, and obtaining a stereo decoded sound signal from the monaural decoded sound signal and the characteristic parameter (so-called upmix processing).

As a monaural encoding/decoding scheme by which a high-quality monaural decoded sound signal can be obtained, there is a 3GPP EVS standard encoding/decoding scheme described in Non-Patent Literature 2. By using a high-quality monaural encoding/decoding scheme like that of Non-Patent Literature 2, as the monaural encoding/decoding scheme of Non-Patent Literature 1, there is a possibility that a higher-quality embedded encoding/decoding of a sound signal having a plurality of channels and a monaural sound signal can be realized.

PRIOR ART LITERATURE

Non-Patent Literature

Non-Patent Literature 1: Jeroen Breebaart et al., "Parametric Coding of Stereo Audio", EURASIP Journal on Applied Signal Processing, pp. 1305-1322, 2005:9.

Non-Patent Literature 2: 3GPP, "Codec for Enhanced Voice Services (EVS); Detailed algorithmic description", TS 26.445.

SUMMARY OF THE INVENTION

Problems to be Solved by the Invention

The upmix processing of Non-Patent Literature 1 is signal processing in the frequency domain that includes processing of applying a window having overlap between adjacent frames to a monaural decoded sound signal. The monaural encoding/decoding scheme of Non-Patent Literature 2 also includes processing of applying a window having overlap between adjacent frames. That is, as for a predetermined range of a boundary part of frames, a decoded sound signal is obtained by combining a signal which is obtained by applying an inclined window in an attenuating shape to a signal obtained by decoding a code of a preceding frame and a signal which is obtained by applying an inclined window in an increasing shape to a signal obtained by decoding a code of a following frame, on both of the decoding side of the stereo encoding/decoding scheme of Non-Patent Literature 1 and the decoding side of the monaural encoding/decoding scheme of Non-Patent Literature 2. From the above, there is a problem that, when a monaural encoding/decoding scheme like that of Non-Patent Literature 2 is used as a monaural encoding/decoding scheme for embedded encoding/decoding like that of Non-Patent Literature 1, a stereo decoded sound signal delays with respect to a monaural decoded sound signal by an amount corresponding to the window in the upmix processing, that is, the algorithmic delay of the stereo encoding/decoding is larger than that of the monaural encoding/decoding.

For example, in a multipoint control unit (MCU) for performing a conference call at many places, it is common to control to switch that a signal from which place is to be outputted to which place, for each predetermined time section, and it is difficult to control in a state where a stereo decoded sound signal delays with respect to a monaural decoded sound signal by an amount corresponding to the window in the upmix processing. Thus, it is assumed that the implementation is such that the control is performed in a state where the stereo decoded sound signal is delayed by one frame with respect to the monaural decoded sound signal. That is, in a communication system that includes a multipoint control unit, the problem described above becomes more prominent, and there is a possibility that the algorithmic delay of stereo encoding/decoding becomes larger than the algorithmic delay of monaural encoding/decoding by one frame. Further, though it becomes possible to control the switching for each predetermined time section by delaying the stereo decoded sound signal with respect to the monaural decoded sound signal by one frame, there is a possibility that the control about a monaural decoded sound signal from which place and a stereo decoded sound signal from which place are to be combined and outputted for each time section becomes complicated because the monaural decoded sound signal and the stereo decoded sound signal have different delays.

The present invention has been made in view of such a problem, and its objective is to provide such embedded encoding/decoding of a sound signal having a plurality of channels and a monaural sound signal that the algorithmic delay of stereo encoding/decoding is not larger than the algorithmic delay of monaural encoding/decoding.

Means to Solve the Problems

In order to solve the above problem, a sound signal decoding method as one aspect of the present invention is a sound signal decoding method for decoding an inputted code for each frame to obtain a decoded sound signal having C channels (C is an integer of 2 or larger), the sound signal decoding method comprising: as processing of a current frame, a monaural decoding step of decoding a monaural code included in the inputted code by a decoding scheme that includes processing of applying a window having overlap between frames to obtain a monaural decoded sound signal; an additional decoding step of decoding an additional code included in the inputted code to obtain an additional decoded signal, which is a monaural decoded signal for a section X, which is a section corresponding to the overlap between the current frame and an immediately following frame; and a stereo decoding step of obtaining a decoded downmix signal, which is a concatenation of a part of the monaural decoded sound signal for a section except the section X and the additional decoded signal for the section X, and obtaining and outputting the decoded sound signal having the C channels from the decoded downmix signal by upmix processing using a characteristic parameter obtained from a stereo code included in the inputted code.

Effects of the Invention

According to the present invention, it is possible to provide such embedded encoding/decoding of a sound signal having a plurality of channels and a monaural sound signal that the algorithmic delay of stereo encoding/decoding is not larger than the algorithmic delay of monaural encoding/decoding.

DETAILED DESCRIPTION OF THE EMBODIMENTS

Before describing each embodiment, each signal and algorithmic delay in encoding/decoding of the background art and a first embodiment will be described first, with reference to FIGS. 7 to 11 schematically illustrating each signal when the frame length is 20 ms. The horizontal axis of each of FIGS. 7 to 11 is a time axis. Since description will be made on an example where a current frame is processed at time t7 below, descriptions of "past" and "future" are attached to the left end and right end of the axis arranged at the top of each diagram, and an upward arrow is attached to the position of t7 which is the time when the current frame is processed. FIGS. 7 to 11 schematically show, for each signal, which time section the signal belongs to, and, when a window is applied, whether the window is in an increasing shape, a flat shape or an attenuating shape. More specifically, in order to visually express that combination of a section with the window in the increasing shape and a section with the window in the attenuating shape yields a signal without windowing, the section with the window in the increasing shape is indicated by a triangular shape that includes a straight line rising to the right, and the section with the window in the attenuating shape is indicated by a triangular shape that includes a straight line falling to the right in FIGS. 7 to 11, because what a window function is strictly like is not important in the description here. Further, hereinafter, though time of the start of each section is identified using words such as "from" or "at and after" in order to avoid a complicated wording expression, the actual start of each section is the time immediately after the specified time, and the actual start of a digital signal for each section is the sample immediately after the specified time, as one skilled in the art could understand.

Figure 7:
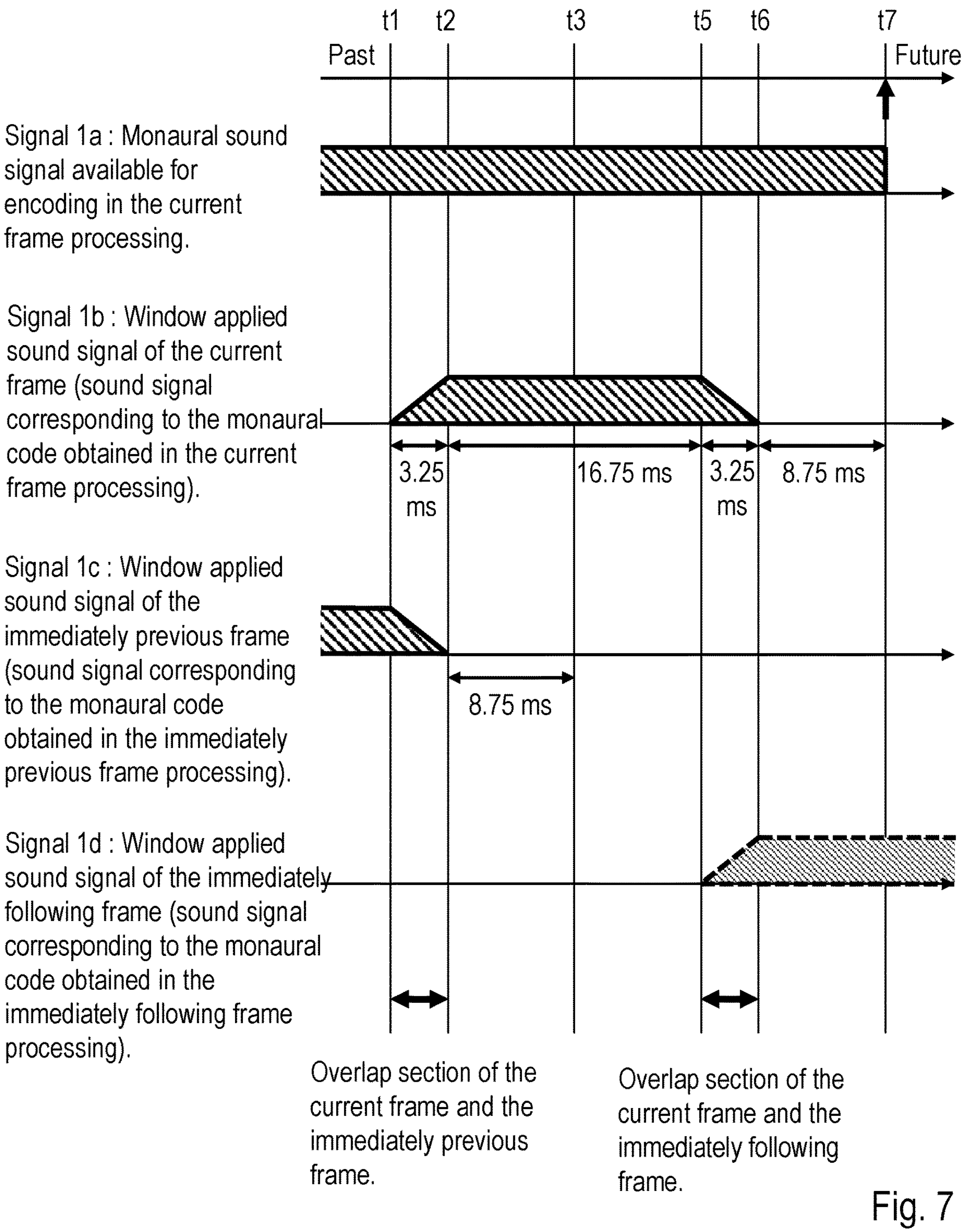
FIG. 7 is a diagram schematically showing each signal in an encoding device of Non-Patent Literature 2.

FIG. 7 is a diagram schematically showing each signal in an encoding device of Non-Patent Literature 2 that processes the current frame at time t7. It is the signal 1*a*, which is a monaural sound signal up to t7, that the encoding device of Non-Patent Literature 2 can use for the processing of the current frame. In the processing of the current frame, the encoding device of Non-Patent Literature 2 uses the 8.75 ms section from t6 to t7 of the signal 1*a* for analysis, as a so-called "look-ahead section", and encodes the signal 1*b*, which is a signal obtained by applying a window to a part of the signal 1*a* for the 23.25 ms section from t1 to t6, to obtain and output a monaural code. The shape of the window is increasing in the 3.25 ms section from t1 to t2, is flat in the 16.75 ms section from t2 to t5 and is attenuating in the 3.25 ms section from t5 to t6. That is, the signal 1*b* is a monaural sound signal corresponding to the monaural code obtained in the processing of the current frame. The encoding device of Non-Patent Literature 2 had already finished similar processing as processing of an immediately previous frame at the time when the monaural sound signal up to t3 was inputted, and had already encoded the signal 1*c* which is a signal obtained by applying a window in a shape of attenuating in the section from t1 to t2 to the monaural sound signal for the 23.25 ms section up to t2. That is, the signal 1*c* is a monaural sound signal corresponding to a monaural code obtained in the processing of the immediately previous frame, and the section from t1 to t2 is an overlap section between the current frame and the immediately previous frame. Further, the encoding device of Non-Patent Literature 2 encodes the signal id, which is a signal obtained by applying a window in a shape of increasing in the section from t5 to t6 to the monaural sound signal for the 23.25 ms section at and after t5, as processing of an immediately following frame. That is, the signal id is a monaural sound signal corresponding to a monaural code obtained in the processing of the immediately following frame, and the section from t5 to t6 is an overlap section between the current frame and the immediately following frame.

Figure 8:
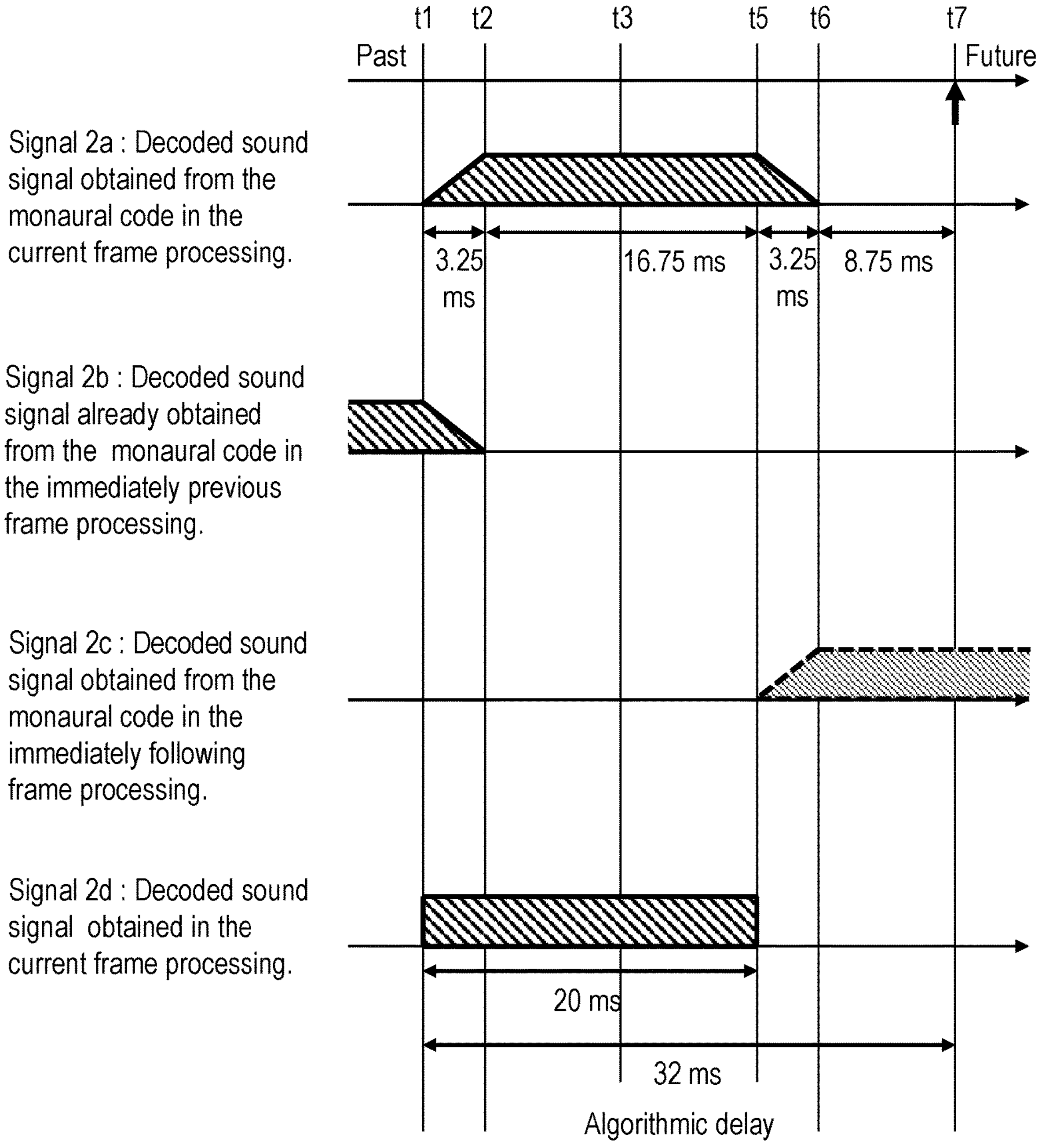
FIG. 8 is a diagram schematically showing each signal and algorithmic delay in a decoding device of Non-Patent Literature 2.

FIG. 8 is a diagram schematically showing each signal in a decoding device of Non-Patent Literature 2 that processes the current frame at time t7 when the monaural code of the current frame is inputted from the encoding device of Non-Patent Literature 2. In the processing of the current frame, the decoding device of Non-Patent Literature 2 obtains the signal 2*a* which is a decoded sound signal for the section from t1 to t6, from the monaural code of the current frame. The signal 2*a* is a decoded sound signal corresponding to the signal 1*b* and is a signal to which the window in the shape of increasing in the section from t1 to t2, being flat in the section from t2 to t5 and attenuating in the section from t5 to t6 is applied. The decoding device of Non-Patent Literature 2 had already obtained the signal 2*b* which is a decoded sound signal of the 23.25 ms section up to t2, to which the window in the shape of attenuating in the section from t1 to t2 is applied, from the monaural code of the immediately previous frame at time t3 when the monaural code of the immediately previous frame was inputted, as the processing of the immediately previous frame. Further, the decoding device of Non-Patent Literature 2 obtains the signal 2*c* which is a decoded sound signal of the 23.25 ms section at and after t5, to which the window in the shape of increasing in the section from t5 to t6 is applied, from a monaural code of the immediately following frame, as processing of the immediately following frame. However, since the signal 2*c* has not been obtained at time t7, a complete decoded sound signal is not obtained for the section from t5 to t6 at time t7 though an incomplete decoded sound signal is obtained. Therefore, at time t7, the decoding device of Non-Patent Literature 2 obtains and outputs the signal 2*d*, which is a monaural decoded sound signal of the 20 ms section from t1 to t5, by combining the signal 2*b* obtained in the processing of the immediately previous frame and the signal 2*a* obtained in the processing of the current frame for the section from t1 to t2 and using the signal 2*a* obtained in the processing of the current frame as it is for the section from t2 to t5. Since the decoding device of Non-Patent Literature 2 obtains the decoded sound signal, whose sections start from t1, at time t7, the algorithmic delay of the monaural encoding/decoding scheme of Non-Patent Literature 2 is 32 ms which is a time length from t1 to t7.

Figure 9:
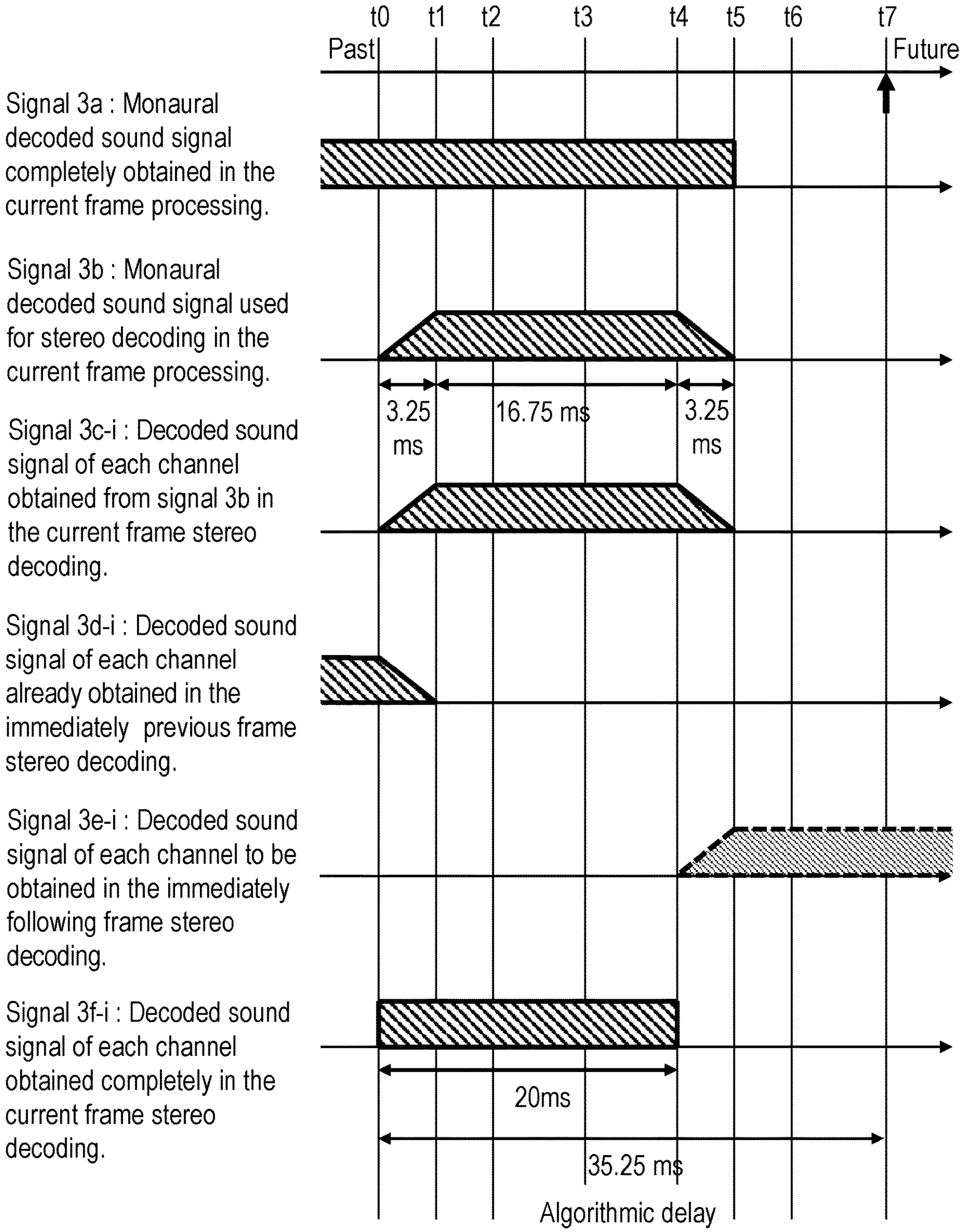
FIG. 9 is a diagram schematically showing each signal and algorithmic delay in a decoding device of Non-Patent Literature 1 when a monaural encoding/decoding scheme of Non-Patent Literature 2 is used as a monaural encoding/decoding scheme.

FIG. 9 is a diagram schematically showing each signal in the decoding device 600 of Non-Patent Literature 1 in a case where the monaural decoding unit 610 uses the monaural decoding scheme of Non-Patent Literature 2. At time t7, the stereo decoding unit 620 performs stereo decoding processing (upmix processing) of the current frame using the signal 3*a*, which is a monaural decoded sound signal up to t5 completely obtained by the monaural decoding unit 610. Specifically, the stereo decoding unit 620 uses the signal 3*b*, which is a signal of the 23.25 ms section from t0 to t5 obtained by applying a window in a shape of increasing in the 3.25 ms section from t0 to t1, being flat in the 16.75 ms section from t1 to t4 and attenuating in the 3.25 ms section from t4 to t5 to the signal 3*a* to obtain the signal 3*c-i* ("i" is a channel number), which is a decoded sound signal from t0 to t5 to which a window in the same shape as the window for the signal 3*b* is applied, for each channel. The stereo decoding unit 620 had already obtained the signal 3*d-i* which is a decoded sound signal of each channel for the 23.25 ms section up to t1, to which a window in a shape of attenuating in the section from t0 to t1 is applied, at the point of time t3, as the processing of the immediately previous frame.

Further, the stereo decoding unit 620 obtains the signal 3*e-i* which is a decoded sound signal of each channel for the 23.25 ms section at and after t4, to which the window in the shape of increasing in the section from t4 to t5 is applied, as the processing of the immediately following frame. However, since the signal 3*e-i* is not obtained at time t7, a complete decoded sound signal is not obtained for the section from t4 to t5 at time t7 though an incomplete decoded sound signal is obtained. Therefore, at the time t7, for each channel, the stereo decoding unit 620 obtains and outputs the signal 3*f-i*, which is a complete decoded sound signal for the 20 ms section from t0 to t4, by combining the signal 3*d-i* obtained in the processing of the immediately previous frame and the signal 3*c-i* obtained in the processing of the current frame for the section from t0 to t1 and using the signal 3*c-i* obtained in the processing of the current frame as it is for the section from t1 to t4. Since the decoding device 600 obtains a decoded sound signal, whose sections start at t0 for each channel, at the point of time t7, the algorithmic delay of the stereo encoding/decoding of Non-Patent Literature 1 using the monaural encoding/decoding scheme of Non-Patent Literature 2 as a monaural encoding/decoding scheme is 35.25 ms which is a time length from t0 to t7. That is, the algorithmic delay of the stereo encoding/decoding in the embedded encoding/decoding is larger than the algorithmic delay of the monaural encoding/decoding.

Figure 10:
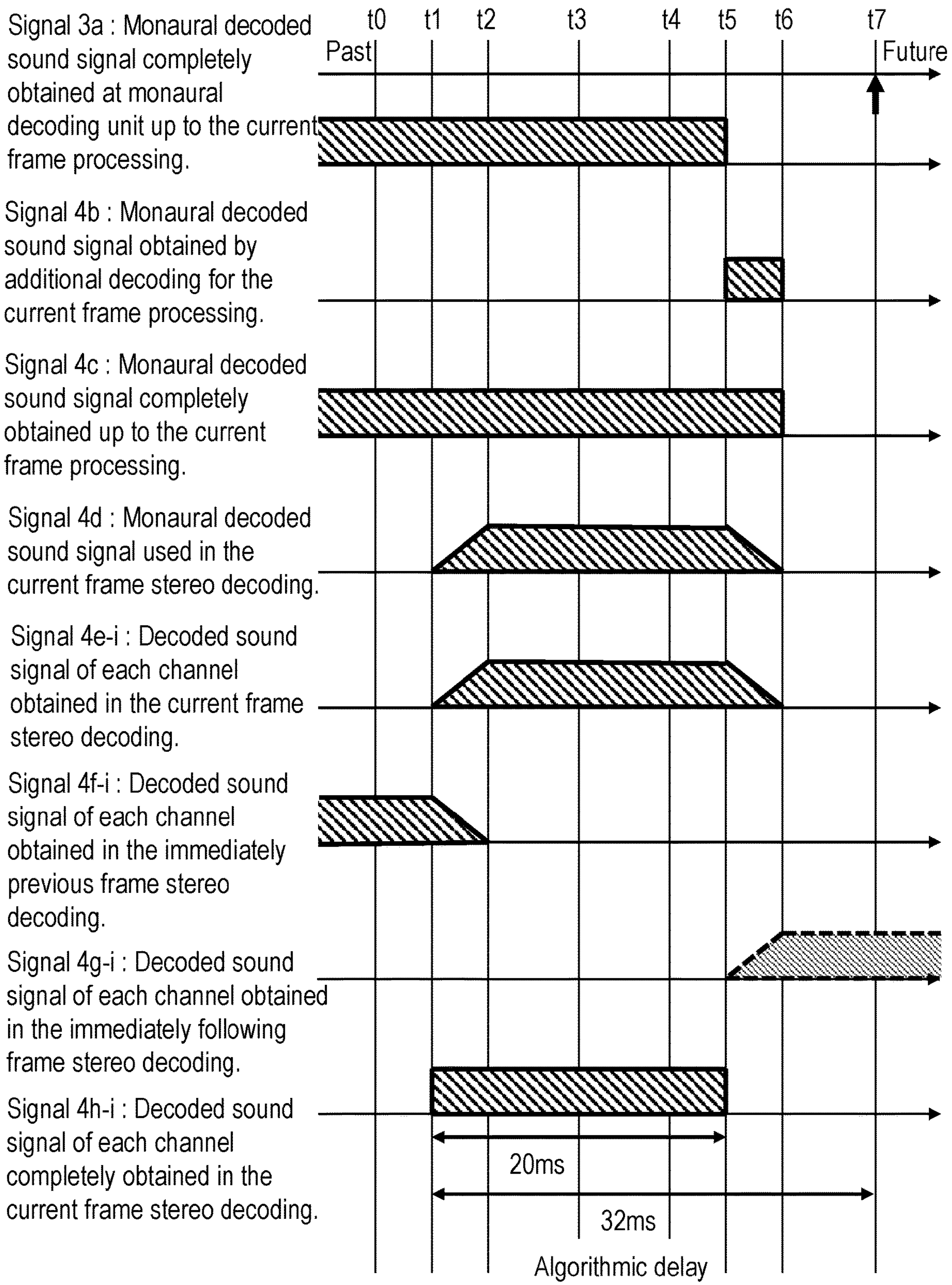
FIG. 10 is a diagram schematically showing each signal and algorithmic delay in the decoding device of the present invention.

FIG. 10 is a diagram schematically showing each signal in a decoding device 200 of the first embodiment described later. The decoding device 200 of the first embodiment has a configuration shown in FIG. 3 and includes a monaural decoding unit 210, an additional decoding unit 230 and a stereo decoding unit 220 that operate as described in detail in the first embodiment. At time t7, the stereo decoding unit 220 processes the current frame using the signal 4*c*, which is a completely obtained monaural decoded sound signal up to t6. As stated in the description of FIG. 9, it is the signal 3*a* which is the monaural decoded sound signal up to t5 that is completely obtained by the monaural decoding unit 210 at time t7. Therefore, in the decoding device 200, the additional decoding unit 230 decodes an additional code CA to obtain the signal 4*b*, which is a monaural decoded sound signal of the 3.25 ms section from t5 to t6 (additional decoding processing), and the stereo decoding unit 220 performs stereo decoding processing (upmix processing) of the current frame using the signal 4*c* concatenating the signal 3*a* which is the monaural decoded sound signal up to t5 obtained by the monaural decoding unit 210, and the signal 4*b* which is the monaural decoded sound signal of the section from t5 to t6 obtained by the additional decoding unit 230. That is, the stereo decoding unit 220 uses the signal 4*d* of the 23.75 ms section from t1 to t6 obtained by applying the window in the shape of increasing in the 3.25 ms section from t1 to t2, being flat in the 16.75 ms section from t2 to t5 and attenuating in the 3.25 ms section from t5 to t6 to the signal 4*c* to obtain the signal 4*e-i*, which is a decoded sound signal of the section from t1 to t6 to which a window in the same shape as the window for the signal 4*d* is applied, for each channel. The stereo decoding unit 220 had already obtained the signal 4*f*-*i* which is a decoded sound signal of each channel for the 23.75 ms section up to t2, to which the window in the shape of attenuating in the section from t1 to t2 is applied, at time t3, as the processing of the immediately previous frame. Further, the stereo decoding unit 220 obtains the signal 4*g*-*i*, which is a decoded sound signal of each channel for the 23.75 ms section at and after t5, to which the window in the shape of increasing in the section from t5 to t6 is applied, as processing of the immediately following frame. However, since the signal 4*g*-*i* is not obtained at time t7, a complete decoded sound signal is not obtained for the section from t5 to t6 at time t7 though an incomplete decoded sound signal is obtained. Therefore, at time t7, for each channel, the stereo decoding unit 220 obtains and outputs the signal 4*h*-*i*, which is a complete decoded sound signal for the 20 ms section from t1 to t5, by combining the signal 4*f*-*i* obtained in the processing of the immediately previous frame and the signal 4*e*-*i* obtained in the processing of the current frame for the section from t1 to t2 and using the signal 4*e*-*i* obtained in the processing of the current frame as it is for the section from t2 to t5. Since the decoding device 200 obtains a decoded sound signal, whose sections start at t1 for each channel, at the point of time t7, the algorithmic delay of the stereo encoding/decoding in the embedded encoding/decoding of the first embodiment is 32 ms which is the time length from t1 to t7. That is, the algorithmic delay of the stereo encoding/decoding by the embedded encoding/decoding of the first embodiment is not larger than the algorithmic delay of the monaural encoding/decoding.

Figure 11:
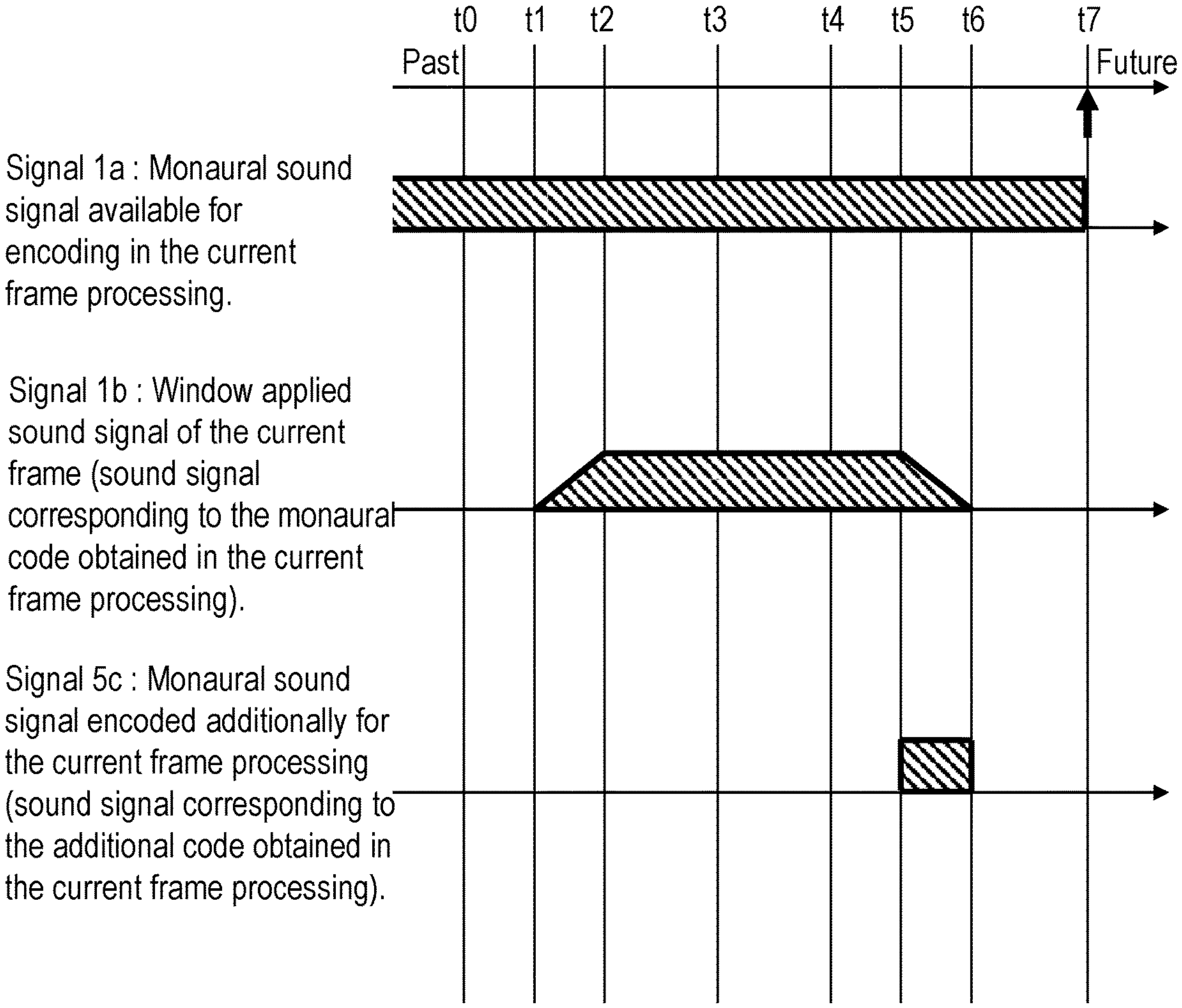
FIG. 11 is a diagram schematically showing each signal in the encoding device of the present invention.

FIG. 11 is a diagram schematically showing each signal in an encoding device 100 of the first embodiment described later, that is, an encoding device corresponding to the decoding device 200 of the first embodiment which is a decoding device for making each signal as schematically shown in FIG. 10. The encoding device 100 of the first embodiment has a configuration shown in FIG. 1 and includes an additional encoding unit 130 that processes encoding the signal 5*c* which is a part of the signal 1*a*, which is a monaural sound signal, for the section from t5 to t6, which is an overlap section between the current frame and the immediately following frame to obtain the additional code CA, in addition to a stereo encoding unit 110 that performs processing similar to that of the stereo encoding unit 510 of the encoding device 500 and a monaural encoding unit 120 that encodes the signal 1*b*, which is a signal obtained by applying a window to a part of the signal 1*a*, which is the monaural sound signal up to t7, for the section from t1 to t6 to obtain a monaural code CM similarly to the monaural encoding unit 520 of the encoding device 500.

Hereinafter, the section from t5 to t6, which is the overlap section between the current frame and the immediately following frame, will be called "section X". That is, on the encoding side, the section X is a section for which the monaural encoding unit 120 encodes a monaural sound signal to which a window is applied, in both of the processing of the current frame and processing of the immediately following frame. More specifically, the section X is a section with a predetermined length of a sound signal that includes an end of the sound signal that the monaural encoding unit 120 encodes in the processing of the current frame, a section for which the monaural encoding unit 120 encodes a sound signal, to which the window in the attenuating shape is applied, in the processing of the current frame, a section with the predetermined length including the beginning of the section encoded by the monaural encoding unit 120 in the processing of the immediately following frame, and a section for which the monaural encoding unit 120 encodes a sound signal, to which the window in the increasing shape is applied, in the processing of the immediately following frame. Further, on the decoding side, the section X is a section for which the monaural decoding unit 210 decodes the monaural code CM to obtain a decoded sound signal to which a window is applied, in both of the processing of the current frame and the processing of the immediately following frame. More specifically, the section X is a section with the predetermined length of a decoded sound signal that the monaural decoding unit 210 obtains by decoding the monaural code CM in the processing of the current frame, that includes the end of the decoded sound signal, a section of the decoded sound signal that the monaural decoding unit 210 obtains by decoding the monaural code CM in the processing of the current frame, to which a window in the attenuating shape is applied, a section with the predetermined length of a decoded sound signal that the monaural decoding unit 210 obtains by decoding the monaural code CM in the processing of the immediately following frame, that includes the start of the decoded sound signal, a section of the decoded sound signal that the monaural decoding unit 210 obtains by decoding the monaural code CM in the processing of the immediately following frame, to which a window in the increasing shape is applied, and a section for which the monaural decoding unit 210 obtains a decoded sound signal by combining the decoded sound signal already obtained by decoding the monaural code CM in the processing of the current frame and the decoded sound signal obtained by decoding the monaural code CM in the processing of the immediately following frame, in the processing of the immediately following frame.

Further, hereinafter, the section t1 to t5, which is a section except the section X in a section for which monaural encoding/decoding is performed in the processing of the current frame, will be called "section Y". That is, the section Y is, on the encoding side, a part of the section for which the monaural sound signal is encoded by the monaural encoding unit 120 in the processing of the current frame except the overlap section between the current frame and the immediately following frame, and on the decoding side, a part of the section for which the monaural code CM is decoded by the monaural decoding unit 210 to obtain a decoded sound signal in the processing of the current frame except the overlap section between the current frame and the immediately following frame. Since the section Y is a concatenation of a section where the monaural sound signal is represented by the monaural code CM of the current frame and the monaural code CM of the immediately previous frame and a section where a monaural sound signal is represented only by the monaural code CM of the current frame, the section Y is a section for which the monaural decoded sound signal can be completely obtained in processing up to the processing of the current frame.

First Embodiment

An encoding device and a decoding device of the first embodiment will be described.

<<Encoding Device 100>>

Figure 1:
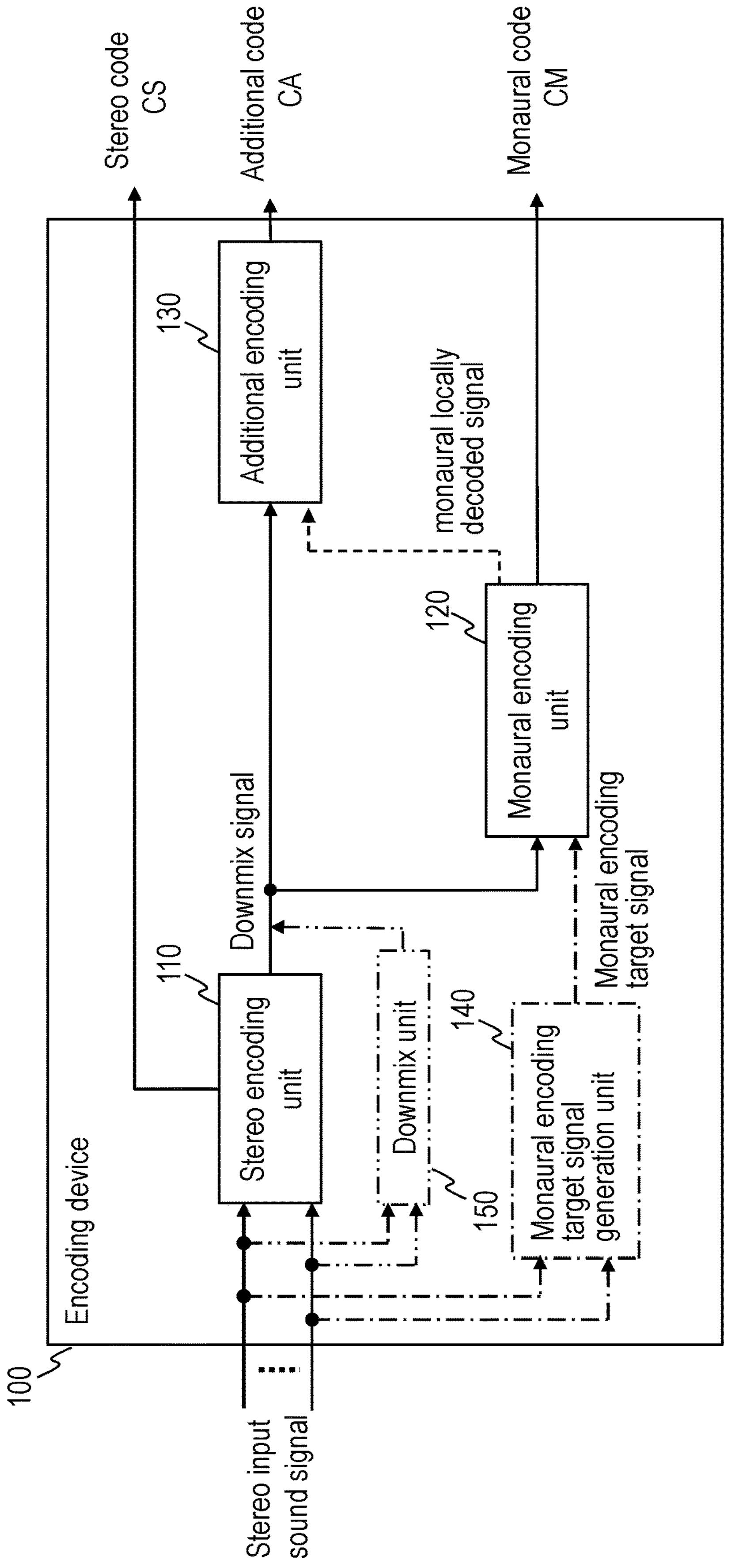
FIG. 1 is a block diagram showing an example of an encoding device of each embodiment.
Figure 2:
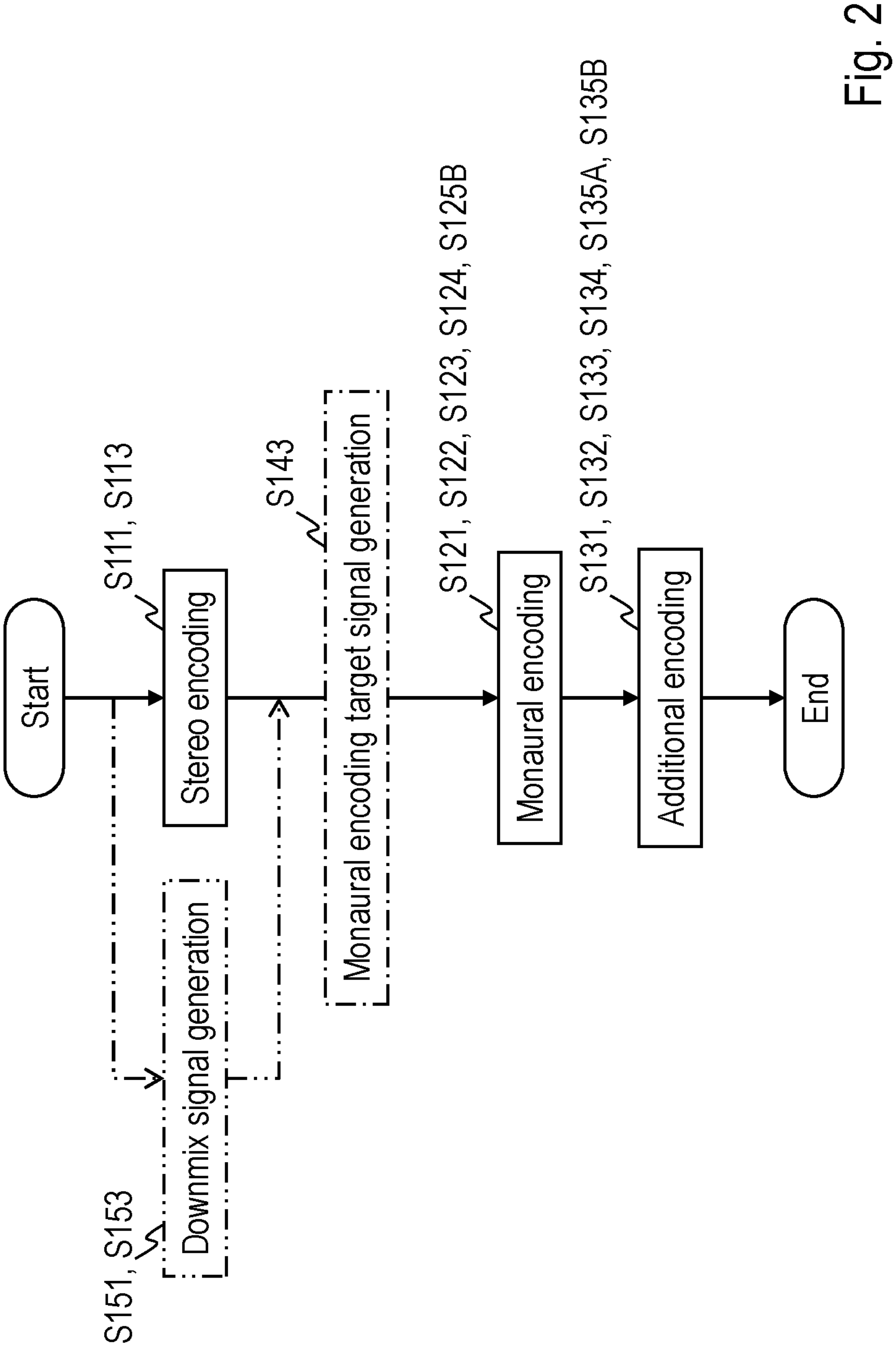
FIG. 2 is a flowchart showing an example of processing of the encoding device of each embodiment.

As shown in FIG. 1, the encoding device 100 of the first embodiment includes the stereo encoding unit 110, the monaural encoding unit 120 and the additional encoding unit 130. The encoding device 100 encodes an inputted two-channel stereo time-domain sound signal (a two-channel stereo input sound signal) for each frame with a predetermined time length, for example, 20 ms to obtain and output a stereo code CS, a monaural code CM and an additional code CA described later. The two-channel stereo input sound signal inputted to the encoding device 100 is a digital voice or acoustic signal obtained, for example, by picking up sound such as voice and music by each of two microphones, and performing AD conversion thereof, and consists of an input sound signal of a left channel which is a first channel and an input sound signal of a right channel which is a second channel. Codes outputted by the encoding device 100, that is, the stereo code CS, the monaural code CM and the additional code CA are inputted to the decoding device 200 described later. The encoding device 100 processes steps S111, S121 and S131 illustrated in FIG. 2 for each frame, that is, each time the above-stated two-channel stereo input sound signal of the predetermined time length is inputted. In the case of the example described above, the encoding device 100 processes steps S111, S121 and S131 for the current frame when a two-channel stereo input sound signal of 20 ms from t3 to t7 is inputted.

[Stereo Encoding Unit 110]

From the two-channel stereo input sound signal inputted to the encoding device 100, the stereo encoding unit 110 obtains and outputs the stereo code CS representing a characteristic parameter, which is a parameter representing a characteristic of difference between the inputted sound signals of the two channels, and a downmix signal which is a signal obtained by mixing the sound signals of the two channels (step S111).

[Example of Stereo Encoding Unit 110]

As an example of the stereo encoding unit 110, an operation of the stereo encoding unit 110 for each frame when taking information representing strength difference between the inputted sound signals of the two channels for each frequency band as the characteristic parameter will be described. Note that, though a specific example using a complex DFT (Discrete Fourier Transformation) is described below, a well-known method for conversion to the frequency domain other than the complex DFT may be used. Note that, in the case of converting such a sample sequence, whose number of samples is not a power of two, into the frequency domain, a well-known technology, such as using a sample sequence with zero stuffing so that the number of samples becomes a power of two, can be used.

First, the stereo encoding unit 110 performs complex DFT for each of the inputted sound signals of the two channels to obtain a complex DFT coefficient sequence (step S111-1). The complex DFT coefficient sequence is obtained by applying a window having overlap between frames and using processing in consideration of symmetry of complex numbers obtained by complex DFT. For example, when the sampling frequency is 32 kHz, the processing is performed each time sound signals of the two channels, each of which has 640 samples corresponding to 20 ms, are inputted; and, for each channel, it is enough to obtain a sequence of 372 complex numbers corresponding to the former half of a sequence of 744 complex numbers to be obtained by performing complex DFT for a digital sound signal sample sequence of successive 744 samples (in the case of the example described above, a sample sequence of the section from t1 to t6) as the complex DFT coefficient sequence; which 744 samples includes 104 samples overlapping with a sample group at the end of the immediately previous frame (in case of the example described above, samples of the section from t1 to t2) and 104 samples overlapping with a sample group at the beginning of the immediately following frame (in the case of the example described above, samples of the section from t5 to t6). Hereinafter, "f" indicates each of integers from 1 to 372; each complex DFT coefficient of a complex DFT coefficient sequence of the first channel is indicated by V1($f$); and each complex DFT coefficient of a complex DFT coefficient sequence of the second channel is indicated by V2($f$). Next, from the complex DFT coefficient sequences of the two channels, the stereo encoding unit 110 obtains sequences of radiuses of the complex DFT coefficients on the complex plane (step S111-2). The radius of each complex DFT coefficient of each channel on the complex plane corresponds to strength of the sound signal of each channel for each frequency bin. Hereinafter, the radius of the complex DFT coefficient V1($f$) of the first channel on the complex plane is indicated by Vir(f), and the radius of the complex DFT coefficient V2($f$) of the second channel on the complex plane is indicated by V2$r(f)$. Next, the stereo encoding unit 110 obtains an average of ratios of radiuses of one channel and radiuses of the other channel for each frequency band, and obtains a sequence of averages as the characteristic parameter (step S111-3). The sequence of averages is the characteristic parameter corresponding to the information representing the strength difference between the inputted sound signals of the two channels for each frequency band. For example, in the case of four bands, "f" of which being from 1 to 93, from 94 to 186, from 187 to 279 and from 280 to 372, the stereo encoding unit 110 obtain 93 values for each of four bands by dividing the radius V1$r(f)$ of the first channel by the radius V2$r(f)$ of the second channel, obtains averages thereof as Mr(1), Mr(2), Mr(3) and Mr(4), and obtains a series of average {Mr(1), Mr(2), Mr(3), Mr(4)} as the characteristic parameter.

Note that the number of bands is only required to be a value equal to or smaller than the number of frequency bins, and the same number as the number of frequency bins or 1 may be used as the number of bands. In the case of using the same value as the number of frequency bins as the number of bands, the stereo encoding unit 110 can obtain, for each frequency bin, a value of a ratio between a radius of one channel and a radius of the other channel and obtain a sequence of the obtained values of ratios as the characteristic parameter. In the case of using 1 as the number of bands, the stereo encoding unit 110 can obtain, for each frequency bin, a value of a ratio between a radius of one channel and a radius of the other channel and obtain an average of the obtained ratio values for all the bands as the characteristic parameter. Further, in case of adopting multiple bands, the number of frequency bins to be included in each frequency band is arbitrary. For example, the number of frequency bins to be included in a low-frequency band may be smaller than the number of frequency bins to be included in a high-frequency band.

Further, the stereo encoding unit 110 may use difference between a radius of one channel and a radius of the other channel, instead of the ratio between a radius of one channel and a radius of the other channel. That is, in the case of the example described above, the stereo encoding unit 110 may use a value obtained by subtracting the radius V2$r(f)$ of the second channel from the radius V1$r(f)$ of the first channel, instead of the value obtained by dividing the radius V1$r(f)$ of the first channel by the radius V2$r(f)$ of the second channel.

Furthermore, the stereo encoding unit 110 obtains the stereo code CS which is a code representing the characteristic parameter (step S111-4). The stereo code CS which is a code representing the characteristic parameter can be obtained by a well-known method. For example, the stereo encoding unit 110 performs vector quantization of the value sequence obtained at step S111-3 to obtain a code, and outputs the obtained code as the stereo code CS. Alternatively, for example, the stereo encoding unit 110 performs scalar quantization of each of the values included in the value sequence obtained at step S111-3 to obtain codes, and outputs the obtained codes together as the stereo code CS. Note that, in a case where what is obtained at step S111-3 is one value, the stereo encoding unit 110 can output a code obtained by scalar quantization of the one value, as the stereo code CS.

The stereo encoding unit 110 also obtains a downmix signal which is a signal obtained by mixing the sound signals of the two channels of the first channel and the second channel (step S111-5). For example, in the processing of the current frame, the stereo encoding unit 110 obtains a downmix signal, which is a monaural signal obtained by mixing the sound signals of the two channels, for 20 ms from t3 to t7. The stereo encoding unit 110 may mix the sound signals of the two channels in the time domain like step S111-5A described later or may mix the sound signals of the two channels in the frequency domain like step S111-5B described later. In the case of mixing in the time domain, for example, the stereo encoding unit 110 obtains a sequence of averages of corresponding samples between the sample sequence of the sound signal of the first channel and the sample sequence of the sound signal of the second channel, as the downmix signal which is a monaural signal obtained by mixing the sound signals of the two channels (step S111-5A). In the case of mixing in the frequency domain, for example, the stereo encoding unit 110 obtains a complex DFT coefficient sequence applying complex DFT to the sample sequence of the first channel sound signal, obtains a complex DFT coefficient sequence applying complex DFT to the sample sequence of the second channel sound signal, obtains a radius average VMr(f) and an angle average VMθ(f) from each complex DFT coefficient thereof, and obtains a sample sequence applying inverse complex DFT to a sequence of complex values VM(f) whose radius is VMr(f) and angle is VMθ(f) on the complex plane, as the downmix signal which is a monaural signal obtained by mixing the sound signals of the two channels (step S111-5B).

Note that, as indicated by two-dot chain lines in FIG. 1, the encoding device 100 may be provided with a downmix unit 150 so that step S111-5 for obtaining a downmix signal may be processed not within the stereo encoding unit 110 but by the downmix unit 150. In this case, the stereo encoding unit 110 obtains and outputs the stereo code CS representing the characteristic parameter which is a parameter representing the characteristic of the difference between the inputted sound signals of the two channels, from the two-channel stereo input sound signal inputted to the encoding device 100 (step S111), and the downmix unit 150 obtains and outputs the downmix signal, which is a signal obtained by mixing the sound signals of the two channels, from the two-channel stereo input sound signal inputted to the encoding device 100 (step S151). That is, the stereo encoding unit 110 may perform steps S111-1 to step S111-4 described above as step S111, and the downmix unit 150 may perform step S111-5 described above as step S151.

[Monaural Encoding Unit 120]

The downmix signal outputted by the stereo encoding unit 110 is inputted to the monaural encoding unit 120. When the encoding device 100 is provided with the downmix unit 150, the downmix signal outputted by the downmix unit 150 is inputted to the monaural encoding unit 120. The monaural encoding unit 120 encodes the downmix signal by a predetermined encoding scheme to obtain and output the monaural code CM (step S121). As the encoding scheme, an encoding scheme that includes processing of applying a window having overlap between frames, for example, like the 13.2 kbps mode of the 3GPP EVS standard (3GPP TS26.445) of Non-Patent Literature 2 is used. In the case of the example described above, in the processing of the current frame, the monaural encoding unit 120 encodes the signal 1*b*, which is a signal for the section from t1 to t6 obtained by applying a window in a shape of increasing in the section from t1 to t2 where the current frame and the immediately previous frame overlap, attenuating in the section from t5 to t6 where the current frame and the immediately following frame overlap and being flat in the section from t2 to t5 between the above sections, to the signal 1*a* which is the downmix signal, using the section from t6 to t7 of the signal 1*a* which is the "look-ahead section" for analysis processing, to obtain and output the monaural code CM.

Thus, when the encoding scheme used by the monaural encoding unit 120 includes processing of applying a window having overlap and analysis processing using a "look-ahead section", not only the downmix signal outputted by the stereo encoding unit 110 or the downmix unit 150 in the processing of the current frame but also a downmix signal outputted by the stereo encoding unit 110 or the downmix unit 150 in frame processing in the past is also used in encoding processing. Therefore, the monaural encoding unit 120 can be provided with a storage not shown to store downmix signals inputted in frame processing in the past so that the monaural encoding unit 120 can process encoding of the current frame using a downmix signal stored in the storage, too. Alternatively, the stereo encoding unit 110 or the downmix unit 150 may be provided with a storage not shown so that the stereo encoding unit 110 or the downmix unit 150 may output a downmix signal to be used by the monaural encoding unit 120 in encoding processing of the current frame, including a downmix signal obtained in frame processing in the past, in the processing of the current frame, and the monaural encoding unit 120 may use the downmix signals inputted from the stereo encoding unit 110 or the downmix unit 150 in the processing of the current frame. Note that storing signals obtained in frame processing in the past in a storage not shown and using a signal in the processing of the current frame, like the above processing, are also performed by each unit described later when necessary. Since it is well-known processing in the technological field of encoding, description thereof will be omitted below in order to avoid redundancy.

[Additional Encoding Unit 130]

The downmix signal outputted by the stereo encoding unit 110 is inputted to the additional encoding unit 130. When the encoding device 100 is provided with the downmix unit 150, the downmix signal outputted by the downmix unit 150 is inputted to the additional encoding unit 130. The additional encoding unit 130 encodes a part of the inputted downmix signal for the section X to obtain and output the additional code CA (step S131). In the case of the example described above, the additional encoding unit 130 encodes the signal 5*c*, which is a downmix signal for the section from t5 to t6, to obtain and output the additional code CA. For the encoding, an encoding scheme such as well-known scalar quantization or vector quantization can be used.

<<Decoding Device 200>>

Figure 3:
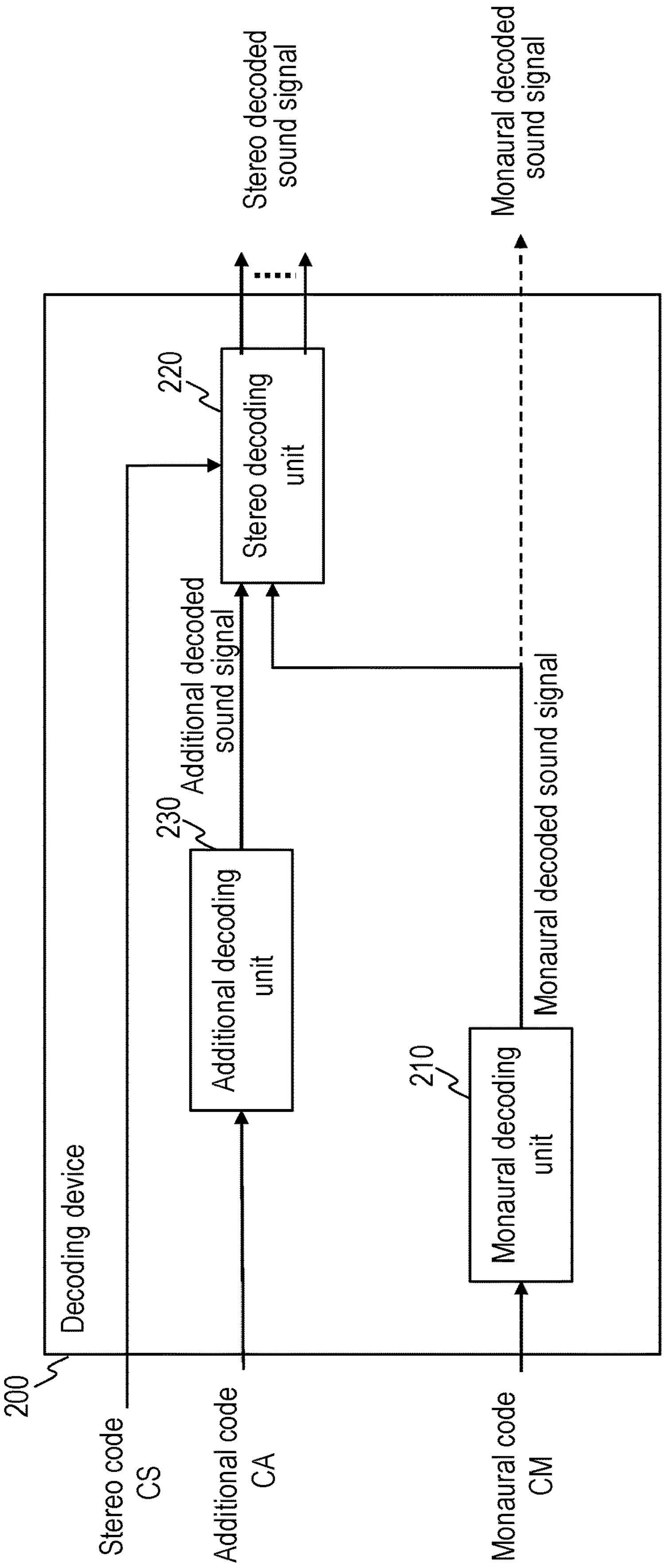
FIG. 3 is a block diagram showing an example of a decoding device of each embodiment.
Figure 4:
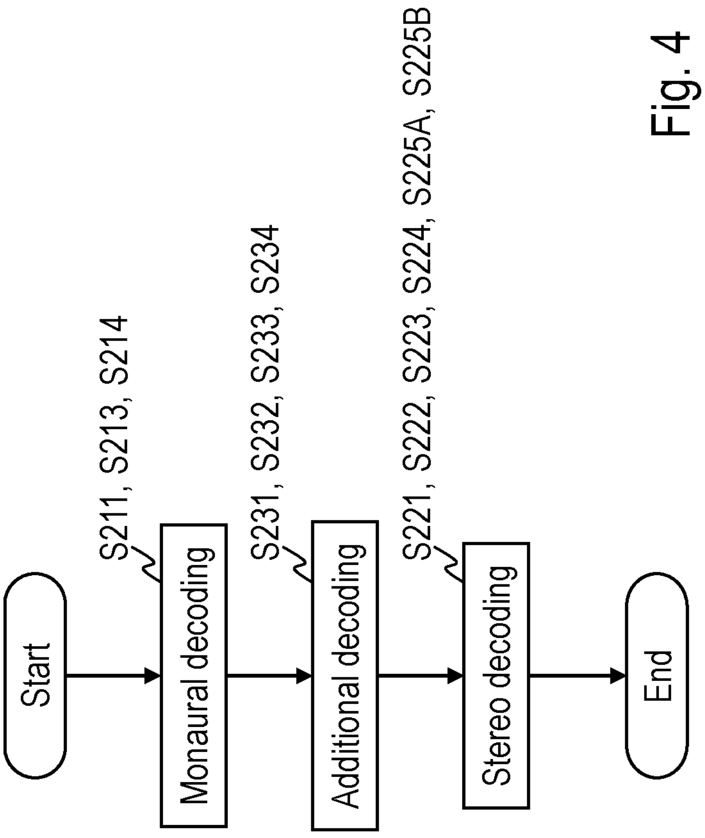
FIG. 4 is a flowchart showing an example of processing of the decoding device of each embodiment.
Figure 5:
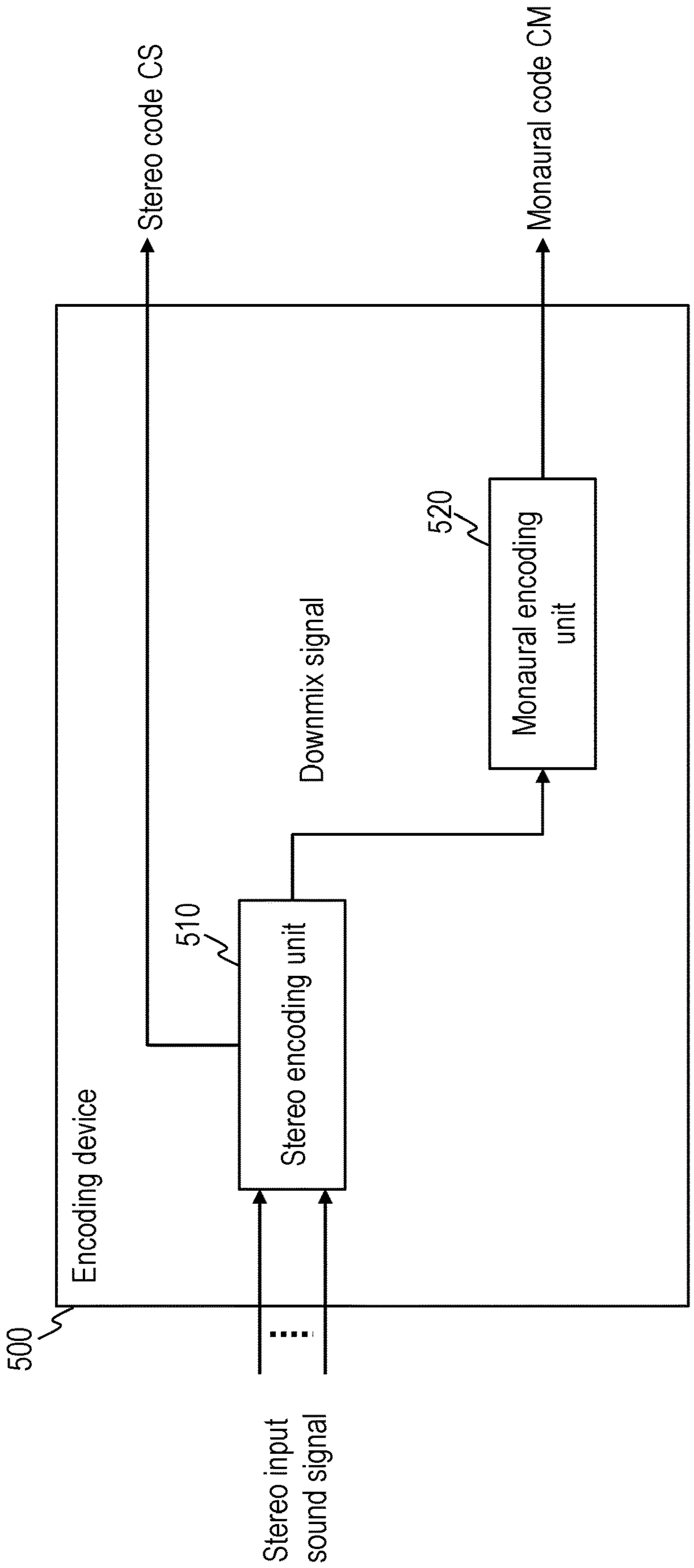
FIG. 5 is a block diagram showing an example of a conventional encoding device.
Figure 6:
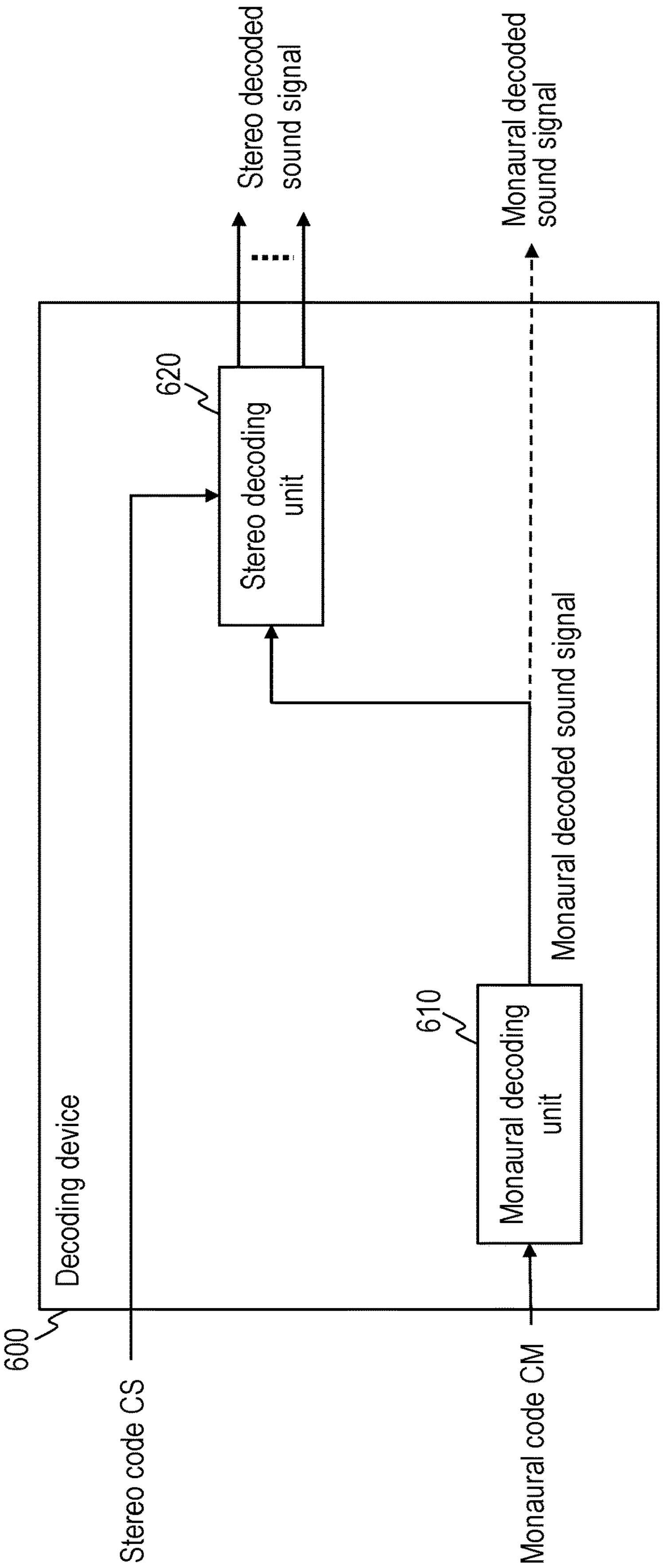
FIG. 6 is a block diagram showing an example of a conventional decoding device.

As shown in FIG. 3, the decoding device 200 of the first embodiment includes the monaural decoding unit 210, the additional decoding unit 230 and the stereo decoding unit 220. For each frame with the same predetermined time length as in the encoding device 100, the decoding device 200 decodes the inputted monaural code CM, additional code CA and stereo code CS to obtain and output the two-channel stereo time-domain sound signal (a two-channel stereo decoded sound signal). The codes inputted to the decoding device 200, that is, the monaural code CM, the additional code CA and the stereo code CS are outputted by the encoding device 100. The decoding device 200 processes steps S211, S221 and S231 illustrated in FIG. 4 for each frame, that is, each time the monaural code CM, the additional code CA and the stereo code CS are inputted at an interval with the predetermined time length described above. In the case of the example described above, when the monaural code CM, the additional code CA and the stereo code CS of the current frame are inputted at time t7, 20 ms after t3, when the immediately previous frame was processed, the decoding device 200 processes steps S211, S221 and S231 for the current frame. Note that, as shown by a broken line in FIG. 3, the decoding device 200 also outputs a monaural decoded sound signal which is a monaural time-domain sound signal when necessary.

[Monaural Decoding Unit 210]

The monaural code CM included among the codes inputted to the decoding device 200 is inputted to the monaural decoding unit 210. The monaural decoding unit 210 obtains and outputs the monaural decoded sound signal for the section Y using the inputted monaural code CM (step S211). As a predetermined decoding scheme, a decoding scheme corresponding to the encoding scheme used by the monaural encoding unit 120 of the encoding device 100 is used. In the case of the example described above, the monaural decoding unit 210 decodes the monaural code CM of the current frame by the predetermined decoding scheme to obtain the signal 2*a* for the 23.25 ms section from t1 to t6, to which the window in the shape of increasing in the 3.25 ms section from t1 to t2, being flat in the 16.75 ms section from t2 to t5 and attenuating in the 3.25 ms section from t5 to t6 is applied. By combining the signal 2*b* obtained from the monaural code CM of the immediately previous frame in the processing of the immediately previous frame and the signal 2*a* obtained from the monaural code CM of the current frame for the section from t1 to t2 and using the signal 2*a* obtained from the monaural code CM of the current frame as it is for a section from t2 to t5, the monaural decoding unit 210 obtains and outputs the signal 2*d*, which is the monaural decoded sound signal for 20 ms section from t1 to t5. Note that, since the signal 2*a* for the section from t5 to t6 obtained from the monaural code CM of the current frame is used as "the signal 2*b* obtained from processing of an immediately previous frame" in the processing of the immediately following frame, the monaural decoding unit 210 stores the signal 2*a* for the section from t5 to t6 obtained from the monaural code CM of the current frame into a storage not shown in the monaural decoding unit 210.

[Additional Decoding Unit 230]

The additional code CA included among the codes inputted to the decoding device 200 is inputted to the additional decoding unit 230. The additional decoding unit 230 decodes the additional code CA to obtain and output an additional decoded signal which is the monaural decoded sound signal for the section X (step S231). For the decoding, a decoding scheme corresponding to the encoding scheme used by the additional encoding unit 130 is used. In the example described above, the additional decoding unit 230 decodes the additional code CA of the current frame to obtain and output the signal 4*b* which is the monaural decoded sound signal for the 3.25 ms section from t5 to t6.

[Stereo Decoding Unit 220]

The monaural decoded sound signal outputted by the monaural decoding unit 210, the additional decoded signal outputted by the additional decoding unit 230 and the stereo code CS included among the codes inputted to the decoding device 200 are inputted to the stereo decoding unit 220. From the inputted monaural decoded sound signal, additional decoded signal and stereo code CS, the stereo decoding unit 220 obtains and outputs a stereo decoded sound signal, which is a decoded sound signal having the two channels (step S221). More specifically, the stereo decoding unit 220 obtains a decoded downmix signal for a section Y+X which is a signal obtained by concatenating the monaural decoded sound signal for the section Y and the additional decoded signal for the section X (that is, a section obtained by concatenating the section Y and the section X) (step S221-1), and obtains and outputs the decoded sound signals of the two channels from the decoded downmix signal obtained at step S221-1 by upmix processing using the characteristic parameter obtained from the stereo code CS (step S221-2). The upmix processing is processing of obtaining the decoded sound signals of the two channels, regarding the decoded downmix signal as a signal obtained by mixing the decoded sound signals of the two channels and regarding the characteristic parameter obtained from the stereo code CS as information representing the characteristic of difference between the decoded sound signals of the two channels. The same goes for each embodiment described later. In the case of the example described above, first, the stereo decoding unit 220 obtains the decoded downmix signal for the 23.25 ms section from t1 to t6 (the section from t1 to t6 of the signal 4*c*) by concatenating the monaural decoded sound signal for the 20 ms section from t1 to t5 outputted by the monaural decoding unit 210 (the section from t1 to t5 of the signals 2*d* and 3*a*) and an additional decoded signal (the signal 4*b*) for the 3.25 ms section from t5 to t6 outputted by the additional decoding unit 230. Next, regarding the decoded downmix signal for the section from t1 to t6 as a signal obtained by mixing the decoded sound signals of the two channels and regarding the characteristic parameter obtained from the stereo code CS as information representing the characteristic of the difference between the decoded sound signals of the two channels, the stereo decoding unit 220 obtains and outputs the decoded sound signals of the two channels for the 20 ms section from t1 to t5 (signals 4*h*-1 and 4*h*-2).

[Example of Step S221-2 Performed by Stereo Decoding Unit 220]

Step S221-2 performed by the stereo decoding unit 220 when the characteristic parameter is information representing the strength difference between the sound signals of the two channels for each frequency band will be described as an example of step S221-2 performed by the stereo decoding unit 220. First, the stereo decoding unit 220 decodes the inputted stereo code CS to obtain the information representing the strength difference for each frequency band (S221-21). The stereo decoding unit 220 obtains the characteristic parameter from the stereo code CS by a scheme corresponding to the scheme by which the stereo encoding unit 110 of the encoding device 100 obtained the stereo code CS from the information representing the strength difference for each frequency band. For example, the stereo decoding unit 220 performs vector decoding of the inputted stereo code CS to obtain element values of a vector corresponding to the inputted stereo code CS as information representing strength differences for a plurality of frequency bands, respectively. Alternatively, for example, the stereo decoding unit 220 performs scalar decoding of each of codes included in the inputted stereo code CS to obtain the information representing the strength difference for each frequency band. Note that, in a case where the number of bands is one, the stereo decoding unit 220 performs scalar decoding of the inputted stereo code CS to obtain information representing the strength difference for the one frequency band, that is, for the whole band.

Next, regarding the decoded downmix signal as a signal obtained by mixing the decoded sound signals of the two channels and regarding the characteristic parameter as the information representing strength difference between the decoded sound signals of the two channels for each frequency band, the stereo decoding unit 220 obtains and outputs the decoded sound signals of the two channels from the decoded downmix signal obtained at step S221-1 and the characteristic parameter obtained at step S221-21 (step S220-22). When the stereo encoding unit 110 of the encoding device 100 operates in the above-stated specific example using complex DFT, the stereo decoding unit 220 operates at step S221-22 as follows.

First, the stereo decoding unit 220 obtains the signal 4*d* obtained by applying the window in the shape of increasing in the 3.25 ms section from t1 to t2, being flat in the 16.75 ms section from t2 to t5 and attenuating in the 3.25 ms section from t5 to t6 to a decoded downmix signal with 744 samples for the 23.25 ms section from t1 to t6 (step S221-221). Next, the stereo decoding unit 220 obtains a sequence of 372 complex numbers of the former half of a sequence of 744 complex numbers to be obtained by performing complex DFT to the signal 4*d* as a complex DFT coefficient sequence (a monaural complex DFT coefficient sequence) (step S221-222). Hereinafter, each complex DFT coefficient of the monaural complex DFT coefficient sequence obtained by the stereo decoding unit 220 is indicated by MQ(f). Next, the stereo decoding unit 220 obtains a radius MQr(f) of each complex DFT coefficient on the complex plane and an angle MQθ(f) of each complex DFT coefficient on the complex plane from the monaural complex DFT coefficient sequence (step S221-223). Next, the stereo decoding unit 220 obtains a value by multiplying each radius MQr(f) by a square root of a corresponding value in the characteristic parameter, as each radius VLQr(f) of the first channel, and obtains a value by dividing each radius MQr(f) by a square root of a corresponding value in the characteristic parameter, as each radius VRQr(f) of the second channel (step S221-224). In the case of the example of the four bands described above, the corresponding value in the characteristic parameter for each frequency bin is Mr(1) when "f" is 1 to 93, Mr(2) when "f" is 94 to 186, Mr(3) when "f" is 187 to 279 and Mr(4) when "f" is 280 to 372. Note that, when the stereo encoding unit 110 of the encoding device 100 uses the difference between the radius of the first channel and the radius of the second channel instead of the ratio between the radius of the first channel and the radius of the second channel, the stereo decoding unit 220 can obtain a value by adding a value obtained by dividing a corresponding value in the characteristic parameter by 2 to each radius MQr(f) as each radius VLQr(f) of the first channel and obtain a value by subtracting the value obtained by dividing a corresponding value in the characteristic parameter by 2 from each radius MQr(f) as each radius VRQr(f) of the second channel. Next, the stereo decoding unit 220 performs inverse complex DFT to the sequence of such complex numbers that the radius and angle on the complex plane are VLQr(f) and MQθ(f), respectively, to obtain a decoded sound signal of the first channel with the 744 samples for the 23.25 ms section from t1 to t6 (the signal 4*e*-1) to which a window is applied, and performs inverse complex DFT to the sequence of such complex numbers that the radius and angle on the complex plane are VRQr(f) and MQθ(f), respectively, to obtain a decoded sound signal of the second channel with the 744 samples for the 23.25 ms section from t1 to t6 (the signal 4*e*-2) (step S221-225) to which a window is applied. The decoded sound signals of the channels to which the window is applied obtained at step S221-225 (the signals 4*e*-1 and 4*e*-2) are signals to which the window in the shape of increasing in the 3.25 ms section from t1 to t2, being flat in the 16.75 ms section from t2 to t5 and attenuating in the 3.25 ms section from t5 to t6 is applied. Next, the stereo decoding unit 220 obtains and outputs the decoded sound signals for the 20 ms section from t1 to t5 (the signal 4*h*-1 and 4*h*-2) by combining the signals obtained at step S221-225 for the immediately previous frame (the signal 4*f*-1 and 4*f*-2) and the signals obtained at step S221-225 for the current frame (the signals 4*e*-1 and 4*e*-2) for the section from t1 to t2, respectively, and using the signals obtained at step S221-225 (the signals 4*e*-1 and 4*e*-2) for the current frame as they are for the section from t2 to t5, for the first and second channels, respectively (step S221-226).

Second Embodiment

Difference between the downmix signal and a locally decoded signal of monaural encoding for the section Y, which is a time section for which the monaural decoding unit 210 can obtain a complete monaural decoded sound signal from the monaural code CM, may also be an encoding target of the additional encoding unit 130. This embodiment is regarded as a second embodiment, and points different from the first embodiment will be described.

[Monaural Encoding Unit 120]

In addition to encoding the downmix signal by the predetermined encoding scheme to obtain and output the monaural code CM, the monaural encoding unit 120 also obtains and outputs a signal obtained by decoding the monaural code CM, that is, a monaural locally decoded signal which is a locally decoded signal of the downmix signal for the section Y (step S122). In the case of the example described above, in addition to obtaining the monaural code CM of the current frame, the monaural encoding unit 120 obtains a locally decoded signal corresponding to the monaural code CM of the current frame, that is, a locally decoded signal to which the window in the shape of increasing in the 3.25 ms section from t1 to t2, being flat in the 16.75 ms section from t2 to t5 and attenuating in the 3.25 ms section from t5 to t6 is applied. By combining a locally decoded signal corresponding to the monaural code CM of the immediately previous frame and the locally decoded signal corresponding to the monaural code CM of the current frame, for the section from t1 to t2, and using the locally decoded signal corresponding to the monaural code CM of the current frame as it is, for the section from t2 to t5, the monaural encoding unit 120 obtains and outputs a locally decoded signal for the 20 ms section from t1 to t5. As the locally decoded signal corresponding to the monaural code CM of the immediately previous frame for the section from t1 to t2, a signal stored in the storage not shown in the monaural encoding unit 120 is used. Since a part of the locally decoded signal corresponding to the monaural code CM of the current frame for the section from t5 to t6 is used as "a locally decoded signal corresponding to the monaural code CM of an immediately previous frame" in the processing of the immediately following frame, the monaural encoding unit 120 stores the locally decoded signal for the section from t5 to t6 obtained from the monaural code CM of the current frame into the storage not shown in the monaural encoding unit 120.

[Additional Encoding Unit 130]

In addition to the downmix signal, the monaural locally decoded signal outputted by the monaural encoding unit 120 is also inputted to the additional encoding unit 130 as shown by a dashed line in FIG. 1. The additional encoding unit 130 encodes not only the downmix signal for the section X which is the encoding target of the additional encoding unit 130 of the first embodiment, but also a difference signal between the downmix signal and the monaural locally decoded signal for the section Y (a signal configured by subtraction between sample values of corresponding samples) to obtain and output the additional code CA (step S132). For example, the additional encoding unit 130 can encode each of the downmix signal for the section X and the difference signal for the section Y to obtain codes and obtain a concatenation of the obtained codes as the additional code CA. For the encoding, an encoding scheme similar to that of the additional encoding unit 130 of the first embodiment can be used. Further, for example, the additional encoding unit 130 may encode a signal obtained by concatenating the difference signal for the section Y and the downmix signal for the section X to obtain the addition code CA. Further, for example, like [Specific example 1 of additional encoding unit 130]below, the additional encoding unit 130 can perform first additional encoding that encodes the downmix signal for the section X to obtain a code (a first additional code CA1) and second additional encoding that encodes a signal obtained by concatenating the difference signal for the section Y (that is, a quantization error signal of the monaural encoding unit 120) and a difference signal between the downmix signal for the section X and the locally decoded signal of the first additional encoding (that is, a quantization error signal of the first additional encoding) to obtain a code (a second additional code CA2), and obtain a combination of the first additional code CA1 and the second additional code CA2 as the additional code CA. According to [Specific example 1 of additional encoding unit 130], the second additional encoding is performed, with a concatenation of such signals that amplitude difference between two sections is assumed to be smaller than that between the difference signal for the section Y and the downmix signal for the section X as an encoding target, and, as for the downmix signal itself, the first additional encoding is performed, with only a short time section as an encoding target. Therefore, efficient encoding can be expected.

[Specific Example 1 of Additional Encoding Unit 130]

First, the additional encoding unit 130 encodes the inputted downmix signal for the section X to obtain the first additional code CA1 (step S132-1; hereinafter also referred to as "first additional encoding") and obtains a locally decoded signal for the section X corresponding to the first additional code CA1, that is, a locally decoded signal of the first encoding for the section X (step S132-2). For the first additional encoding, an encoding scheme such as well-known scalar quantization or vector quantization can be used. Next, the additional encoding unit 130 obtains a difference signal (a signal configured by subtraction between sample values of corresponding samples) between the inputted downmix signal for the section X and the locally decoded signal for the section X obtained at step S132-2 (step S132-3). Further, the additional encoding unit 130 obtains a difference signal (a signal configured by subtraction between sample values of corresponding samples) between the downmix signal and the monaural locally decoded signal for the section Y (step S132-4). Next, the additional encoding unit 130 encodes a signal obtained by concatenating the difference signal for the section Y obtained at step S132-4 and the difference signal for the section X obtained at step S132-3 to obtain the second additional code CA2 (step S132-5; hereinafter also referred to as "second additional encoding"). For the second additional encoding, an encoding scheme of collectively encoding a sample sequence obtained by concatenating a sample sequence of the difference signal for the section Y obtained at step S132-4 and a sample sequence of the difference signal for the section X obtained at step S132-3, for example, an encoding scheme using prediction in the time domain or an encoding scheme adapted to amplitude imbalance in the frequency domain is used. Next, the additional encoding unit 130 outputs a concatenation of the first additional code CA1 obtained at step S132-1 and the second additional code CA2 obtained at step S132-5 as the additional code CA (step S132-6).

Note that the additional encoding unit 130 may target a weighted difference signal for encoding instead of the difference signal described above. That is, the additional encoding unit 130 may code a weighted difference signal (a signal configured by weighted subtraction between sample values of corresponding samples) between the downmix signal and the monaural locally decoded signal for the section Y and the downmix signal for the section X to obtain and output the additional code CA. In the case of [Specific example 1 of additional encoding unit 130], the additional encoding unit 130 can obtain the weighted difference signal (a signal configured by weighted subtraction between sample values of corresponding samples) between the downmix signal and the monaural locally decoded signal for the section Y as the processing of step S132-4. Similarly, the additional encoding unit 130 may obtain the weighted difference signal (a signal configured by weighted subtraction between sample values of corresponding samples) between the inputted downmix signal for the section X and the locally decoded signal for the section X obtained at step S132-2 as the processing of step S132-3 of [Specific example 1 of additional encoding unit 130]. In these cases, the weight used for generation of each weighted difference signal can be encoded by a well-known encoding technology to obtain a code, and the obtained code (a code representing the weight) can be included in the additional code CA. Though the above is the same for each difference signal in each embodiment described later, it is well known in the technological field of encoding that a weighted difference signal is targeted by encoding instead of a difference signal and that, in that case, the weight is also coded. Therefore, in the embodiments described later, each individual description will be omitted to avoid redundancy, and only description in which a difference signal and a weighted difference signal are written together using "or" and description in which subtraction and weighted subtraction are written together using "or" will be made.

[Additional Decoding Unit 230]

The additional decoding unit 230 decodes the additional code CA to obtain and output not only the additional decoded signal for the section X, which is an additional decoded signal obtained by the additional decoding unit 230 of the first embodiment but also an additional decoded signal for the section Y (step S232). For the decoding, a decoding scheme corresponding to the encoding scheme used by the additional encoding unit 130 at step S132 is used. That is, if the additional encoding unit 130 uses [Specific example 1 of additional encoding unit 130] at step S132, the additional decoding unit 230 performs the processing of [Specific example 1 of additional decoding unit 230] described below.

[Specific Example 1 of Additional Decoding Unit 230]

First, the additional decoding unit 230 decodes the first additional code CA1 included in the additional code CA to obtain a first decoded signal for the section X (step S232-1; hereinafter also referred to as "first additional decoding"). For the first additional decoding, a decoding scheme corresponding to the encoding scheme used for the first additional encoding by the additional encoding unit 130 is used. Further, the additional decoding unit 230 decodes the second additional code CA2 included in the additional code CA to obtain a second decoded signal for the sections Y and X (step S232-2; hereinafter also referred to as "second additional decoding"). For the second additional decoding, a decoding scheme corresponding to the encoding scheme used by the additional encoding unit 130 for the second additional encoding is used, that is, a decoding scheme that yields, from the code, a collective sample sequence which is a concatenation of a sample sequence of the additional decoded signal for the section Y and a sample sequence of the second decoded signal for the section X; for example, a decoding scheme using prediction in the time domain or a decoding scheme adapted to amplitude imbalance in the frequency domain. Next, the additional decoding unit 230 obtains a part of the second decoded signal obtained at step S232-2 for the section Y as the additional decoded signal for the section Y, obtains an addition signal (a signal configured by addition of sample values of corresponding samples) of the first decoded signal for the section X obtained at step S232-1 and a part of the second decoded signal for the section X obtained at step S232-2 as the additional decoded signal for the section X, and outputs the additional decoded signals for the sections Y and X (step S232-4).

Note that, when the additional encoding unit 130 targets not a difference signal but a weighted difference signal for encoding, a code representing a weight is also included in the additional code CA, and thus the additional decoding unit 230 can decode a code of the additional code CA except the code representing the weight to obtain and output an additional decoded signal, and decode the code representing the weight, which is included in the additional code CA, to obtain and output the weight at step S232 described above. In the case of [Specific example 1 of additional decoding unit 230], a code representing a weight for the section X, which is included in the additional code CA, is decoded to obtain the weight for the section X; and, at step S232-4, the additional decoding unit 230 can obtain the part of the second decoded signal obtained at step S232-2 for the section Y as the additional decoded signal for the section Y, obtain a weighted addition signal (a signal configured by weighted addition of sample values of corresponding samples) of the first decoded signal for the section X obtained at step S232-1 and the part of the second decoded signal obtained at step S232-2 for the section X as the additional decoded signal for the section X, and output the additional decoded signals for the sections Y and X and a weight for the section Y obtained by decoding a code representing the weight for the section Y, which is included in the additional code CA. Though the above is the same for addition of signals in each embodiment described later, it is well known in the technological field of encoding that weighted addition (generation of a weighted sum signal) is performed instead of addition (generation of a sum signal) and that, in that case, a weight is also obtained from a code. Therefore, in the embodiments described later, respective descriptions will be omitted to avoid redundancy, and only description in which addition and weighted addition are written together using "or" and description in which a sum signal and a weighted sum signal are written together using "or" will be made.

[Stereo Decoding Unit 220]

The stereo decoding unit 220 performs steps S222-1 and S222-2 below (step S222).

The stereo decoding unit 220 obtains a signal concatenating a sum signal (a signal configured by addition of sample values of corresponding samples) of the monaural decoded sound signal for the section Y and the additional decoded signal for the section Y and the additional decoded signal for the section X, as a decoded downmix signal for the section Y+X (step S222-1) instead of step S221-1 performed by the stereo decoding unit 220 of the first embodiment and obtains and outputs the decoded sound signals of the two channels from the decoded downmix signal obtained at step S222-1 by the upmix processing using the characteristic parameter obtained from the stereo code CS, using the decoded downmix signal obtained at step S222-1 instead of the decoded downmix signal obtained at step S221-1 (step S222-2).

Note that, when the additional encoding unit 130 targets not a difference signal but a weighted difference signal for encoding, the stereo decoding unit 220 can obtain a signal concatenating a weighted sum signal (a signal configured by weighted addition of sample values of corresponding samples) of the monaural decoded sound signal for the section Y and the additional decoded signal for the section Y and the additional decoded signal for the section X, as the decoded downmix signal for the section X+Y at step S222-1. For generation of the weighted sum signal (weighted addition of sample values of corresponding samples) of the monaural decoded sound signal for the section Y and the additional decoded signal for the section Y, the weight for the section Y outputted by the additional decoding unit 230 can be used. Though the above is the same for addition of signals in each embodiment described later, it is well known in the technological field of encoding that weighted addition (generation of a weighted sum signal) is performed instead of addition (generation of a sum signal) and that, in that case, a weight is also obtained from a code as described in the description of the additional decoding unit 230. Therefore, in the embodiments described later, respective description will be omitted to avoid redundancy, and only description in which addition and weighted addition are written together using "or" and description in which a sum signal and a weighted sum signal are written together using "or" will be made.

According to the second embodiment, in addition to that the algorithmic delay of stereo encoding/decoding is not larger than the algorithmic delay of monaural encoding/decoding, it is possible to cause the quality of a decoded downmix signal used for stereo decoding to be higher than the first embodiment. Therefore, it is possible to cause the sound quality of a decoded sound signal of each channel obtained by stereo decoding to be high. That is, in the second embodiment, the monaural encoding processing by the monaural encoding unit 120 and the additional encoding processing by the additional encoding unit 130 are used as encoding processing for high-quality encoding of a downmix signal; the monaural code CM and the additional code CA are obtained as codes that represents the favorable downmix signal; and the monaural decoding processing by the monaural decoding unit 210 and the additional decoding processing by the additional decoding unit 230 are used as decoding processing for obtaining a high-quality decoded downmix signal. A code amount assigned to each of the monaural code CM and the additional code CA can be arbitrarily determined according to purposes. In the case of realizing higher-quality stereo encoding/decoding in addition to standard-quality monaural encoding/decoding, a larger code amount can be assigned to the additional code CA. That is, "monaural code" and "additional code" are mere convenient names from a viewpoint of stereo encoding/decoding. Since each of the monaural code CM and the additional code CA is a part of a code representing a downmix signal, one of the codes may be called "a first downmix code", and the other may be called "a second downmix code". When it is assumed that a larger code amount is assigned to the additional code CA, the additional code CA may be called "a downmix code", "a downmix signal code" or the like. The above is the same in a third embodiment and each embodiment based on the second embodiment described after the third embodiment.

Third Embodiment

There may be a case where it is possible for the stereo decoding unit 220 to obtain the decoded sound signals of the two channels with a higher sound quality by using a decoded downmix signal corresponding to a downmix signal obtained by mixing sound signals of the two channels in the frequency domain, and it is possible for the monaural decoding unit 210 to obtain a monaural decoded sound signal with a higher sound quality when the monaural encoding unit 120 encodes a signal obtained by mixing sound signals of the two channels in the time domain. In such a case, it is preferable that the stereo encoding unit 110 obtains the downmix signal by mixing the sound signals of the two channels inputted to the encoding device 100 in the frequency domain, that the monaural encoding unit 120 encodes a signal obtained by mixing the sound signals of the two channels inputted to the encoding device 100 in the time domain, and that the additional encoding unit 130 also encodes difference between the signal obtained by mixing the sound signals of the two channels in the frequency domain and the signal obtained by mixing the sound signals of the two channels in the time domain. This embodiment is regarded as a third embodiment, and points different from the second embodiment will be mainly described.

[Stereo Encoding Unit 110]

The stereo encoding unit 110 operates as described in the first embodiment similarly to the stereo encoding unit 110 of the second embodiment. However, as for the processing of obtaining the downmix signal which is the signal obtained by mixing the sound signals of the two channels, the processing is performed by processing of mixing the sound signals of the two channels in the frequency domain, for example, like step S111-5B (step S113). That is, the stereo encoding unit 110 obtains a downmix signal obtained by mixing the sound signals of the two channels in the frequency domain. For example, in the processing of the current frame, the stereo encoding unit 110 can obtain a downmix signal, which is a monaural signal obtained by mixing the sound signals of the two channels in the frequency domain, for the section from t1 to t6. When the encoding device 100 is also provided with the downmix unit 150, the stereo encoding unit 110 obtains and outputs the stereo code CS representing the characteristic parameter, which is a parameter representing the characteristic of the difference between the sound signals of the two channels inputted from the two-channel stereo input sound signal inputted to the encoding device 100 (step S113), and the downmix unit 150 obtains and outputs the downmix signal, which is a signal obtained by mixing the sound signals of the two channels in the frequency domain, from the two-channel stereo input sound signal inputted to the encoding device 100 (step S153).

[Monaural Encoding Target Signal Generation Unit 140]

The encoding device 100 of the third embodiment also includes a monaural encoding target signal generation unit 140 as shown by a one-dot chain line in FIG. 1. The two-channel stereo input sound signal inputted to the encoding device 100 is inputted to the monaural encoding target signal generation unit 140. The monaural encoding target signal generation unit 140 obtains a monaural encoding target signal, which is a monaural signal, from the inputted two-channel stereo input sound signal by processing of mixing the sound signals of the two channels in the time domain (step S143). For example, the monaural encoding target signal generation unit 140 obtains a sequence of averages of corresponding samples between the sample sequence of the sound signal of the first channel and the sample sequence of the sound signal of the second channel, as the monaural encoding target signal which is a signal obtained by mixing the sound signals of the two channels. That is, the monaural encoding target signal obtained by the monaural encoding target signal generation unit 140 is a signal obtained by mixing the sound signals of the two channels in the time domain. For example, in the processing of the current frame, the monaural encoding target signal generation unit 140 can obtain the monaural encoding target signal, which is the monaural signal obtained by mixing the sound signals of the two channels in the time domain, for 20 ms from t3 to t7.

[Monaural Encoding Unit 120]

The monaural encoding target signal outputted by the monaural encoding target signal generation unit 140 is inputted to the monaural encoding unit 120 instead of the downmix signal outputted by the stereo encoding unit 110 or the downmix unit 150. The monaural encoding unit 120 encodes the monaural encoding target signal to obtain and output the monaural code CM (step S123). For example, in the processing of the current frame, the monaural encoding unit 120 encodes the signal for the section from t1 to t6 obtained by applying the window in the shape of increasing in the section from t1 to t2 where the current frame and the immediately previous frame overlap, attenuating in the section from t5 to t6 where the current frame and the immediately following frame overlap and being flat in the section from t2 to t5 between the above sections, to the monaural encoding target signal, using the section from t6 to t7 of the monaural encoding target signal which is "a look-ahead section" for analysis processing, to obtain and output the monaural code CM.

[Additional Encoding Unit 130]

Similarly to the additional encoding unit 130 of the second embodiment, the additional encoding unit 130 encodes a difference signal or weighted difference signal (a signal configured by subtraction or weighted subtraction between sample values of corresponding samples) between the downmix signal and the monaural locally decoded signal for the section Y and the downmix signal for the section X to obtain and output the additional code CA (step S133). Here, the downmix signal for the section Y is a signal obtained by mixing the sound signals of the two channels in the frequency domain, and the monaural locally decoded signal for the section Y is a signal obtained by locally decoding a signal obtained by mixing the sound signals of the two channels in the time domain.

Note that, similarly to the additional encoding unit 130 of the second embodiment, the additional encoding unit 130 of the third embodiment can perform the first additional encoding that encodes the downmix signal for the section X to obtain a first additional code CA and the second additional encoding that encodes a signal obtained by concatenating the difference signal or weighted difference signal for the section Y and the difference signal or weighted difference signal between the downmix signal for the section X and the locally decoded signal of the first additional encoding to obtain a second additional code CA2, and obtain a concatenation of the first additional code CA1 and the second additional code CA2 as the additional code CA, as described in [Specific example 1 of additional encoding unit 130].

[Monaural Decoding Unit 210]

Similarly to the monaural decoding unit 210 of the second embodiment, the monaural decoding unit 210 obtains and outputs the monaural decoded sound signal for the section Y using the monaural code CM (step S213). However, the monaural decoded sound signal obtained by the monaural decoding unit 120 of the third embodiment is a decoded signal of a signal obtained by mixing sound signals of the two channels in the time domain.

[Additional Decoding Unit 230]

Similarly to the additional decoding unit 230 of the second embodiment, the additional decoding unit 230 decodes the additional code CA to obtain and output additional decoded signals for the sections Y and X, (step S233). However, the additional decoded signal for the section Y includes difference between a signal obtained by mixing sound signals of the two channels in the time domain and the monaural decoded sound signal, and difference between a signal obtained by mixing the sound signals of the two channels in the frequency domain and the signal obtained by mixing the sound signals of the two channels in the time domain.

[Stereo Decoding Unit 220]

The stereo decoding unit 220 performs steps S223-1 and S223-2 below (step S223). Similarly to the additional decoding unit 230 of the second embodiment, the stereo decoding unit 220 obtains a signal obtained by concatenating a sum signal or weighted sum signal (a signal configured by addition or weighted addition of sample values of corresponding samples) of the monaural decoded sound signal for the section Y and an additional decoded signal for the section Y and an additional decoded signal for the section X, as the decoded downmix signal for the section Y+X (step S223-1), and obtains and outputs the decoded sound signals of the two channels from the decoded downmix signal obtained at step S223-1 by the upmix processing using the characteristic parameter obtained from the stereo code CS (step S223-2). However, the sum signal for the section Y includes the monaural decoded sound signal obtained by performing monaural encoding/decoding of the signal obtained by mixing the sound signals of the two channels in the time domain, difference between the signal obtained by mixing the sound signals of the two channels in the time domain and the monaural decoded sound signal, and difference between the signal obtained by mixing the sound signals of the two channels in the frequency domain and the signal obtained by mixing the sound signals of the two channels in the time domain.

Fourth Embodiment

As for the section X, though a correct locally decoded signal or decoded signal cannot be obtained by the monaural encoding unit 120 or the monaural decoding unit 210 without a signal and codes of the immediately following frame, an incomplete locally decoded signal or decoded signal can be obtained only with a signal and codes of frames up to the current frame. Therefore, each of the first to third embodiments may be changed so that, as for the section X, the additional encoding unit 130 encodes not the downmix signal itself but difference between the downmix signal and a monaural locally decoded signal obtained from the signal of the frames up to the current frame. This embodiment will be described as fourth embodiments.

Fourth Embodiment A

First, for a fourth embodiment A, which is a fourth embodiment obtained by changing the second embodiment, description will be made mainly on points different from the second embodiment.

[Monaural Encoding Unit 120]

Similarly to the monaural encoding unit 120 of the second embodiment, the downmix signal outputted by the stereo encoding unit 110 or the downmix unit 150 is inputted to the monaural encoding unit 120. The monaural encoding unit 120 obtains and outputs the monaural code CM obtained by encoding the downmix signal, and a signal obtained by decoding the monaural code CM of the frames up to the current frame, that is, a monaural locally decoded signal, which is a locally decoded signal of the downmix signal for the section Y+X (step S124). More specifically, in addition to obtaining the monaural code CM of the current frame, the monaural encoding unit 120 obtains a locally decoded signal corresponding to the monaural code CM of the current frame, that is, a locally decoded signal to which the window in the shape of increasing in the 3.25 ms section from t1 to t2, being flat in the 16.75 ms section from t2 to t5 and attenuating in the 3.25 ms section from t5 to t6 is applied; and, by combining a locally decoded signal corresponding to the monaural code CM of the immediately previous frame and the locally decoded signal corresponding to the monaural code CM of the current frame, for the section from t1 to t2, and using the locally decoded signal corresponding to the monaural code CM of the current frame as it is, for the section from t2 to t6, the monaural encoding unit 120 obtains and outputs a locally decoded signal for the section of 23.25 ms from t1 to t6. However, a locally decoded signal for the section from t5 to t6 is a locally decoded signal that becomes a complete locally decoded signal by being combined with a locally decoded signal to which the window in the increasing shape is applied, the locally decoded signal being obtained in processing of the immediately following frame, and is an incomplete locally decoded signal to which the window in the attenuating shape is applied.

[Additional Encoding Unit 130]

Similarly to the additional encoding unit 130 of the second embodiment, the downmix signal outputted by the stereo encoding unit 110 or the downmix unit 150, and the monaural locally decoded signal outputted by the monaural encoding unit 120 are inputted to the additional encoding unit 130. The additional encoding unit 130 encodes a difference signal or weighted difference signal (a signal configured by subtraction or weighted subtraction between sample values of corresponding samples) between the downmix signal and the monaural locally decoded signal for the section Y+X to obtain and output the additional code CA (step S134).

[Monaural Decoding Unit 210]

Similarly to the monaural decoding unit 210 of the second embodiment, the monaural code CM is inputted to the monaural decoding unit 210. The monaural decoding unit 210 obtains and outputs the monaural decoded sound signal for the section Y+X using the monaural code CM (step S214). However, the decoded signal for the section X, that is, the section from t5 to t6 is a decoded signal that becomes a complete decoded signal by being combined with a decoded signal to which the window in the increasing shape is applied, the decoded signal being obtained in processing of the immediately following frame, and is an incomplete decoded signal to which the window in the attenuating shape is applied.

[Additional Decoding Unit 230]

Similarly to the additional decoding unit 230 of the second embodiment, the additional code CA is inputted to the additional decoding unit 230. The additional decoding unit 230 decodes the additional code CA to obtain and output an additional decoded signal for the section Y+X (step S234).

[Stereo Decoding Unit 220]

Similarly to the stereo decoding unit 220 of the second embodiment, the monaural decoded sound signal outputted by the monaural decoding unit 210, the additional decoded signal outputted by the additional decoding unit 230 and the stereo code CS inputted to the decoding device 200 are inputted to the stereo decoding unit 220. The stereo decoding unit 220 obtains a sum signal or weighted sum signal (a signal configured by addition or weighted addition of sample values of corresponding samples) of the monaural decoded sound signal and the additional decoded signal for the section Y+X as the decoded downmix signal, and obtains and outputs the decoded sound signals of the two channels from the decoded downmix signal by the upmix processing using the characteristic parameter obtained from the stereo code CS (step S224).

Fourth Embodiment B

Note that, by replacing "the downmix signal outputted by the stereo encoding unit 110 or the downmix unit 150" and "the downmix signal" in the description of the monaural encoding unit 120 of the fourth embodiment A with "the monaural encoding target signal outputted by the monaural encoding target signal generation unit 140" and "the monaural encoding target signal", respectively, description mainly on points different from the third embodiment for a fourth embodiment B, which is a fourth embodiment obtained by changing the third embodiment, is obtained.

Fourth Embodiment C

Further, by assuming that each of the monaural locally decoded signal obtained by the monaural encoding unit 120, the difference signal or weighted difference signal coded by the additional encoding unit 130 and the additional decoded signal obtained by the additional decoding unit 230 in the description of the fourth embodiment A is the signal for the section X, and the stereo decoding unit 220 obtains a signal that is a concatenation of the monaural decoded sound signal for the section Y and a sum signal or weighted sum signal of the monaural decoded sound signal and the additional decoded signal for the section X as the decoded downmix signal, a fourth embodiment C, which is a fourth embodiment obtained by changing the first embodiment, is obtained.

Fifth Embodiment

The downmix signal for the section X includes a part that can be predicted from the monaural locally decoded signal for the section Y. Therefore, for the section X, the difference between the downmix signal and a predicted signal from the monaural locally decoded signal for the section Y may be encoded by the additional encoding unit 130 in each of the first to fourth embodiments. This embodiment will be described as fifth embodiments.

Fifth Embodiment A

First, regarding fifth embodiments obtained by changing the second embodiment, the third embodiment, the fourth embodiment A and the fourth embodiment B, respectively, as fifth embodiment A, points different from each of the second embodiment, the third embodiment, the fourth embodiment A and the fourth embodiment B will be described.

[Additional Encoding Unit 130]

The additional encoding unit 130 performs steps S135A-1 and S135A-2 below (step S135A). First, the additional encoding unit 130 obtains a predicted signal for the monaural locally decoded signal for the section X from the inputted monaural locally decoded signal for the section Y or the section Y+X (however, for the section X, an incomplete monaural locally decoded signal as described above) using a predetermined well-known prediction technology (step S135A-1). Note that, in the case of the fifth embodiment obtained by changing the fourth embodiment A or the fifth embodiment obtained by changing the fourth embodiment B, the inputted incomplete monaural locally decoded signal for the section X is included in the predicted signal for the section X. Next, the additional encoding unit 130 encodes the difference signal or weighted difference signal (a signal configured by subtraction or weighted subtraction between sample values of corresponding samples) between the downmix signal and the monaural locally decoded signal for the section Y and a difference signal or weighted difference signal (a signal configured by subtraction or weighted subtraction between sample values of corresponding samples) between the downmix signal for the section X and the predicted signal obtained at step S135A-1 to obtain and output the additional code CA (step S135A-2). For example, a signal obtained by concatenating the difference signal for the section Y and the difference signal for the section X may be encoded to obtain the additional code CA. Further, for example, each of the difference signal for the section Y and the difference signal for the section X may be encoded to obtain a code, and a concatenation of the obtained codes may be obtained as the additional code CA. For the encoding, an encoding scheme similar to that of the additional encoding unit 130 of each of the second embodiment, the third embodiment, the fourth embodiment A and the fourth embodiment B can be used.

[Stereo Decoding Unit 220]

The stereo decoding unit 220 performs steps S225A-0 to S225A-2 below (step S225A). First, the stereo decoding unit 220 obtains the predicted signal for the section X from the monaural decoded sound signal for the section Y or the section Y+X, using the same prediction technology used by the additional encoding unit 130 at step S135 (step S225A-0). Next, the stereo decoding unit 220 obtains a signal obtained by concatenating a sum signal or weighted sum signal (a signal configured by addition or weighted addition of sample values of corresponding samples) of the monaural decoded sound signal and the additional decoded signal for the section Y and a sum signal or weighted sum signal (a signal configured by addition or weighted addition of sample values of corresponding samples) of the additional decoded signal and the predicted signal for the section X as the decoded downmix signal for the section Y+X (step S225A-1). Next, the stereo decoding unit 220 obtains and outputs the decoded sound signals of the two channels from the decoded downmix signal obtained at step S225A-1, by the upmix processing using the characteristic parameter obtained from the stereo code CS (step S225A-2).

Fifth Embodiment B

Next, regarding a fifth embodiment obtained by changing each of the first embodiment and the fourth embodiment C as a fifth embodiment B, points different from each of the first embodiment and the fourth embodiment C will be described.

[Monaural Encoding Unit 120]

In addition to the monaural code CM obtained by encoding the downmix signal, the monaural encoding unit 120 also obtains and outputs, for the section Y or the section Y+X, a signal obtained by decoding the monaural code CM of the frames up to the current frame, that is, a monaural locally decoded signal which is a locally decoded signal of the inputted downmix signal (step S125B). However, as described above, the monaural locally decoded signal for the section X is an incomplete monaural locally decoded signal.

[Additional Encoding Unit 130]

The additional encoding unit 130 performs steps S135B-1 and S135B-2 below (step S135B). First, the additional encoding unit 130 obtains the predicted signal for the monaural locally decoded signal for the section X from the inputted monaural locally decoded signal for the section Y or the section Y+X (however, for the section X, an incomplete monaural locally decoded signal as described above) using the predetermined well-known prediction technology (step S135B-1). In the case of the fifth embodiment obtained by changing the fourth embodiment C, the inputted monaural locally decoded signal for the section X is included in the predicted signal for the section X. Next, the additional encoding unit 130 encodes the difference signal or weighted difference signal between the downmix signal for the section X and the predicted signal (a signal configured by subtraction or weighted subtraction between sample values of corresponding samples) obtained at step S135B-1 to obtain and output the additional code CA (step S135B-2). For the encoding, for example, an encoding scheme similar to that of the additional encoding unit 130 of each of the first embodiment and the fourth embodiment C can be used.

[Stereo Decoding Unit 220]

The stereo decoding unit 220 performs steps S225B-0 to S225B-2 below (step S225B). First, the stereo decoding unit 220 obtains the predicted signal for the section X from the monaural decoded sound signal for the section Y or the section Y+X, using the same prediction technology used by the additional encoding unit 130 (step S225B-0). Next, the stereo decoding unit 220 obtains a signal that is a concatenation of the monaural decoded sound signal for the section Y and a sum signal or weighted sum signal (a signal configured by addition or weighted addition of sample values of corresponding samples) of the additional decoded signal and the predicted signal for the section X as the decoded downmix signal for the section Y+X (step S225B-1). Next, the stereo decoding unit 220 obtains and outputs the decoded sound signals of the two channels from the decoded downmix signal obtained at step S225B-1, by the upmix processing using the characteristic parameter obtained from the stereo code CS (step S225B-2).

Sixth Embodiment

In the first to fifth embodiments, by the decoding device 200 using the additional code CA obtained by the encoding device 100, the decoded downmix signal for the section X used by the stereo decoding unit 220 is obtained at least by decoding the additional code CA. However, without the decoding device 200 using the additional code CA, a predicted signal from the monaural decoded sound signal for the section Y may be used as the decoded downmix signal for the section X used by the stereo decoding unit 220. This embodiment is regarded as a sixth embodiment, and points different from the first embodiment will be described.

<<Encoding Device 100>>

The encoding device 100 of the sixth embodiment is different from the encoding device 100 of the first embodiment in that the encoding device 100 of the sixth embodiment does not include the additional encoding unit 130, does not code the downmix signal for the section X, and does not obtain the additional code CA. That is, the encoding device 100 of the sixth embodiment includes the stereo encoding unit 110 and the monaural encoding unit 120, and the stereo encoding unit 110 and the monaural encoding unit 120 operates as the stereo encoding unit 110 and the monaural encoding unit 120 of the first embodiment, respectively.

<<Decoding Device 200>>

The decoding device 200 of the sixth embodiment does not include the additional decoding unit 230 for decoding the additional code CA but includes the monaural decoding unit 210 and the stereo decoding unit 220. Though the monaural decoding unit 210 of the sixth embodiment operates as the monaural decoding unit 210 of the first embodiment, the monaural decoding unit 210 also outputs the monaural decoded sound signal for the section X when the stereo decoding unit 220 uses the monaural decoded sound signal for the section Y+X. Further, the stereo decoding unit 220 of the sixth embodiment operates as described below that is different from the operation of the stereo decoding unit 220 of the first embodiment.

[Stereo Decoding Unit 220]

The stereo decoding unit 220 performs steps S226-0 to S226-2 below (step S226). First, the stereo decoding unit 220 obtains the predicted signal for the section X from the monaural decoded sound signal for the section Y or the section Y+X, using a predetermined well-known prediction technology similar to that of the fifth embodiment (step S226-0). Next, the stereo decoding unit 220 obtains a signal that is a concatenation of the monaural decoded sound signal for the section Y and the predicted signal for the section X, as the decoded downmix signal for the section Y+X (step S226-1) and obtains and outputs the decoded sound signals of the two channels from the decoded downmix signal obtained at step S226-1 by the upmix processing using the characteristic parameter obtained from the stereo code CS (step S226-2).

Seventh Embodiment

In each embodiment described above, description has been made on an example in which sound signals of two channels are handled to simplify the description. However, the number of channels is not limited thereto and is only required to be two or more. When the number of channels is indicated by C (C is an integer of 2 or larger), each embodiment described above can be implemented, with "two channels" replaced with "C channels" (C is an integer of 2 or larger).

For example, the encoding device 100 of the first to fifth embodiments can obtain the stereo code CS, the monaural code CM and the additional code CA from inputted sound signals of the C channels; the encoding device 100 of the sixth embodiment can obtain the stereo code CS and the monaural code CM from the inputted sound signals of the C channels; the stereo encoding unit 110 can obtain and output a code representing information corresponding to difference between channels of the inputted sound signals of the C channels, as the stereo code CS; the stereo encoding unit 110 or the downmix unit 150 can obtain and output a signal obtained by mixing the inputted sound signals of the C channels as the downmix signal; and the monaural encoding target signal generation unit 140 can obtain and output a signal obtained by mixing the inputted sound signals of the C channels in the time domain, as the monaural encoding target signal. For example, the information corresponding to the difference between channels of the sound signals of the C channels is, for each of C-1 channels other than a reference channel, information corresponding to difference between the sound signal of the channel and the sound signal of the reference channel.

Similarly, the decoding device 200 of the first to fifth embodiments can obtain and output the decoded sound signals of the C channels based on the inputted monaural code CM, additional code CA and stereo code CS; the decoding device 200 of the sixth embodiment can obtain and output the decoded sound signals of the C channels based on the inputted monaural code CM and stereo code CS; and the stereo decoding unit 220 can obtain and output the decoded sound signals of the C channels from the decoded downmix signal by the upmix processing using the characteristic parameter obtained based on the inputted stereo code CS. More specifically, the stereo decoding unit 220 can obtain and output the decoded sound signals of the C channels, regarding the decoded downmix signal as a signal obtained by mixing the decoded sound signals of the C channels, and regarding the characteristic parameter obtained based on the inputted stereo code CS as information representing the characteristic of the difference between channels of the decoded sound signals of the C channels.

<Program and Recording Medium>

Figure 12:
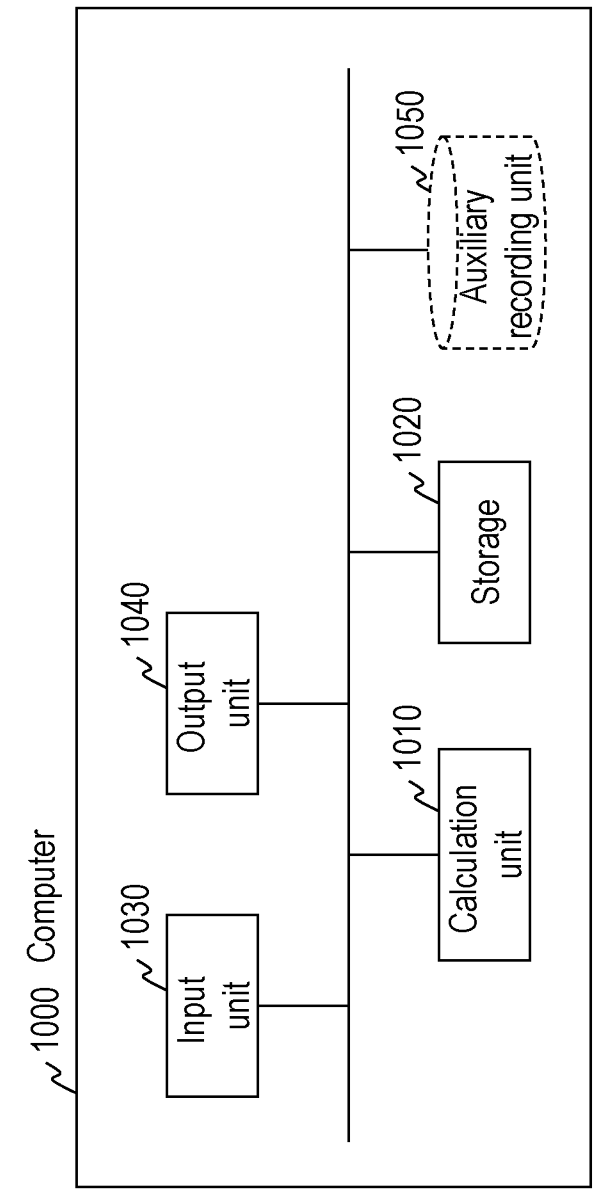
FIG. 12 is a diagram showing an example of a functional configuration of a computer that realizes each device of each embodiment.

The processing of each unit of each encoding device and each decoding device described above may be realized by a computer. In this case, the processing content of a function that each device should have is written by a program. Then, by loading the program onto a storage 1020 of a computer shown in FIG. 12 and causing a calculation unit 1010, an input unit 1030, an output unit 1040 and the like to operate, various kinds of processing functions of each of the devices described above are realized on the computer.

The program in which the processing content is written can be recorded in a computer-readable recording medium. The computer-readable recording medium is, for example, a non-transitory recording medium, specifically, a magnetic recording device, an optical disk or the like.

Further, distribution of this program is performed, for example, by sales, transfer, lending or the like of a portable recording medium such as a DVD or a CD-ROM in which the program is recorded. Furthermore, a configuration is also possible in which this program is stored in a storage of a server computer, and is distributed by transfer from the server computer to other computers via a network.

The computer that executes such a program once stores the program recorded in a portable recording medium or transferred from a server computer into an auxiliary recording unit 1050, which is its own non-transitory storage, first. Then, at the time of executing processing, the computer loads the program stored in the auxiliary recording unit 1050, which is its own non-transitory storage, into the storage 1020 and executes the processing according to the loaded program. Further, as another execution form of this program, a computer may directly load the program from a portable recording medium into the storage 1020 and execute the processing according to the program. Furthermore, each time a program is transferred to the computer from a sever computer, the computer may sequentially execute processing according to the received program. Further, a configuration is also possible in which the above processing is executed by a so-called ASP (application service provider) type service in which, without transferring the program to the computer from the server computer, the processing functions are realized only by an instruction to execute the program and acquisition of a result. Note that it is assumed that, as the program described herein, information which is provided for processing by an electronic calculator and is equivalent to a program (data or the like which is not a direct command to the computer but has a nature of specifying processing of the computer) is included.

Though it is assumed in the description above that the device is configured by causing a predetermined program to be executed on a computer, at least a part of the processing content may be realized by hardware.

In addition, it goes without saying that it is possible to appropriately make changes within a range not departing from the spirit of the present invention.

What is claimed is:

1. A sound signal decoding method for decoding an inputted code representing an encoded sound signal for each time frame to obtain a decoded sound signal having C channels (C is an integer of 2 or larger), the sound signal decoding method comprising:

as processing for a current frame, decoding a monaural code included in the inputted code by a decoding scheme that includes processing of applying a window having overlap between frames to obtain a monaural decoded sound signal;

decoding an additional code included in the inputted code to obtain an additional decoded signal, wherein the additional decoded signal represents a monaural decoded signal of a section corresponding to the overlap between the current frame and an immediately following frame (hereinafter referred to as "a section X");

obtaining a decoded downmix signal, wherein the decoded downmix signal represents a concatenation of a part of the monaural decoded sound signal of a section except the section X (hereinafter referred to as "a section Y") and the additional decoded signal for the section X; and obtaining and outputting the decoded sound signal having the C channels from a windowed signal of the decoded downmix signal by upmix processing using a characteristic parameter obtained from a stereo code included in the inputted code, thereby a first time delay caused by the stereo decoding of the frame is not longer than a second time delay caused by the monaural decoding.

2. The sound signal decoding method according to claim 1, wherein the decoding the additional code further comprises decoding the additional code included in the inputted code to obtain the additional decoded signal, and the additional decoded signal represents a monaural decoded signal for each of the section Y and the section X, the decoded downmix signal represents a concatenation of a signal configured by addition or weighted addition of sample values of corresponding samples between the monaural decoded sound signal and the additional decoded signal for the section Y, and the additional decoded signal for the section X, and the obtaining and outputting the decoded sound signal further comprises obtaining and outputting the decoded sound signal having the C channels from the windowed signal of the decoded downmix signal by the upmix processing using the characteristic parameter obtained from the stereo code included in the inputted code.

3. The sound signal decoding method according to claim 2, wherein the decoding the additional code further comprises:

decoding a first additional code included in the additional code to obtain a first additional decoded signal for the section X, decoding a second additional code included in the additional code by a decoding scheme of obtaining a collective sample sequence from a code to obtain a second additional decoded signal for each of the section Y and the section X, obtaining the second additional decoded signal for the section Y as the additional decoded signal for the section Y, and obtaining a signal configured by addition or weighted addition of sample values of corresponding samples between the first additional decoded signal and the second additional decoded signal for the section X, as the additional decoded signal for the section X.

4. The sound signal decoding method according to claim 2, wherein the obtaining the decoded downmix signal further comprises:

obtaining a predicted signal for the section X from the monaural decoded sound signal for the section Y or the monaural decoded sound signals for the section Y and the section X, concatenating the signal configured by addition or weighted addition of the sample values of the corresponding samples between the monaural decoded sound signal and the additional decoded signal for the section Y, and a signal configured by addition or weighted addition of sample values of corresponding samples between the predicted signal and the additional decoded signal for the section X to obtain the decoded downmix signal, and the obtaining and outputting the decoded sound signal further comprises:

obtaining and outputting the decoded sound signal having the C channels from the windowed signal of the decoded downmix signal by the upmix processing using the characteristic parameter obtained from the stereo code included in the inputted code.

5. A sound signal decoding device for decoding an inputted code representing an encoded sound signal for each time frame to obtain a decoded sound signal having C channels (C is an integer of 2 or larger), the sound signal decoding device comprising a processor configured to execute operations comprising, as processing for a current frame:

decoding a monaural code included in the inputted code by a decoding scheme that includes processing of applying a window having overlap between frames to obtain a monaural decoded sound signal, as processing for a current frame;

decoding an additional code included in the inputted code to obtain an additional decoded signal, wherein the additional decoded signal represents a monaural decoded signal of a section corresponding to the overlap between the current frame and an immediately following frame (hereinafter referred to as “a section X”), as processing for the current frame;

obtaining a decoded downmix signal, wherein the decoded downmix signal represents a concatenation of a part of the monaural decoded sound signal of a section except the section X (hereinafter referred to as “a section Y”) and the additional decoded signal for the section X; and obtaining and output the decoded sound signal having the C channels from a windowed signal of the decoded downmix signal by upmix processing using a characteristic parameter obtained from a stereo code included in the inputted code, thereby a first time delay caused by the stereo decoding of the frame is not longer than a second time delay caused by the monaural decoding.

6. The sound signal decoding device according to claim 5, wherein the decoding the additional code further comprises decoding the additional code included in the inputted code to obtain the additional decoded signal, the additional decoded signal represents a monaural decoded signal for each of the section Y and the section X, the decoded downmix signal represents a concatenation of a signal configured by addition or weighted addition of sample values of corresponding samples between the monaural decoded sound signal and the additional decoded signal for the section Y, and the additional decoded signal for the section X, and the obtaining and outputting the decoded sound signal further comprises obtaining and outputting the decoded sound signal having the C channels from the windowed signal of the decoded downmix signal by the upmix processing using the characteristic parameter obtained from the stereo code included in the inputted code.

7. The sound signal decoding device according to claim 6, wherein the decoding the additional code further comprises:

decoding a first additional code included in the additional code to obtain a first additional decoded signal for the section X, decoding a second additional code included in the additional code by a decoding scheme of obtaining a collective sample sequence from a code to obtain a second additional decoded signal for each of the section Y and the section X, obtaining the second additional decoded signal for the section Y as the additional decoded signal for the section Y, and obtaining a signal configured by addition or weighted addition of sample values of corresponding samples between the first additional decoded signal and the second additional decoded signal for the section X, as the additional decoded signal for the section X.

8. The sound signal decoding device according to claim 6, wherein the obtaining the decoded downmix signal further comprises:

obtaining a predicted signal for the section X from the monaural decoded sound signal for the section Y or the monaural decoded sound signals for the section Y and the section X, obtaining the decoded downmix signal, which is a concatenation of the signal configured by addition or weighted addition of the sample values of the corresponding samples between the monaural decoded sound signal and the additional decoded signal for the section Y, and a signal configured by addition or weighted addition of sample values of corresponding samples between the predicted signal and the additional decoded signal for the section X, and the obtaining and outputting the decoded sound signal further comprises:

obtaining and outputting the decoded sound signal having the C channels from the windowed signal of the decoded downmix signal by the upmix processing using the characteristic parameter obtained from the stereo code included in the inputted code.

9. A non-transitory computer-readable recording medium in which a program for causing a computer to execute each step of the sound signal decoding method according to claim 1 is recorded.

* * * * *